US010511724B2

(12) United States Patent
Shaw et al.

(10) Patent No.: US 10,511,724 B2
(45) Date of Patent: *Dec. 17, 2019

(54) METHOD AND APPARATUS FOR ADAPTIVE CHARGING AND PERFORMANCE IN A SOFTWARE DEFINED NETWORK

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,912

(22) Filed: Mar. 28, 2019

(65) Prior Publication Data

US 2019/0230228 A1    Jul. 25, 2019

Related U.S. Application Data

(63) Continuation of application No. 15/340,700, filed on Nov. 1, 2016.

(51) Int. Cl.
*H04M 15/00* (2006.01)
*H04L 12/14* (2006.01)
*H04W 4/24* (2018.01)

(52) U.S. Cl.
CPC ...... *H04M 15/852* (2013.01); *H04L 12/1417* (2013.01); *H04M 15/8353* (2013.01); *H04M 15/858* (2013.01); *H04W 4/24* (2013.01)

(58) Field of Classification Search
CPC ........... H04M 15/852; H04M 15/8383; H04M 15/858; H04L 12/1417; H04W 4/24
See application file for complete search history.

(56) References Cited

U.S. PATENT DOCUMENTS 4,285,469 A    8/1981   Huang
5,671,253 A    9/1997   Stewart
(Continued)

FOREIGN PATENT DOCUMENTS

CN    102045896 A    5/2011
CN    105227385 A    1/2016
(Continued)

OTHER PUBLICATIONS

"Cell Site on Light Trucks", 2007, 1 page.
(Continued)

*Primary Examiner* — Marisol Figueroa
(74) *Attorney, Agent, or Firm* — Guntin & Gust, PLC; Jay Anderson

(57) ABSTRACT

Aspects of the subject disclosure may include, for example, a method including instantiating a virtual network function to provide a network resource in the network, accessing data usage information associated with facilitation of a service to a communication device via the network, determining whether the communication device exceeds a data limit threshold according the data usage information, accessing a data limit instruction associated with the communication device responsive to determining that the communication device exceeds the data limit threshold, determining a modification to the virtual network function associated with the facilitation of the service according to the data limit instruction, and communicating with the network to cause the modification to the virtual network function. Other embodiments are disclosed.

20 Claims, 9 Drawing Sheets

(56) References Cited

U.S. PATENT DOCUMENTS

| | | |
|---|---|---|
| 5,970,408 A | 10/1999 | Carlsson et al. |
| 6,246,883 B1 | 6/2001 | Lee |
| 6,542,500 B1 | 4/2003 | Gerszberg et al. |
| 6,795,686 B2 | 9/2004 | Master et al. |
| 6,873,620 B1 | 3/2005 | Coveley et al. |
| 6,917,622 B2 | 7/2005 | McKinnon, III et al. |
| 7,167,923 B2 | 1/2007 | Lo et al. |
| 7,206,294 B2 | 4/2007 | Garahi et al. |
| 7,532,640 B2 | 5/2009 | Kelly et al. |
| 7,660,583 B2 | 2/2010 | Pekonen et al. |
| 7,787,414 B2 | 8/2010 | Le Faucheur et al. |
| 8,145,208 B2 | 3/2012 | Chari et al. |
| 8,150,421 B2 | 4/2012 | Ward et al. |
| 8,234,650 B1 | 7/2012 | Eppstein et al. |
| 8,385,977 B2 | 2/2013 | Fein et al. |
| 8,593,968 B2 | 11/2013 | Santiago et al. |
| 8,621,058 B2 | 12/2013 | Eswaran et al. |
| 8,676,219 B2 | 3/2014 | Lennvall et al. |
| 8,868,069 B2 | 10/2014 | Bennett et al. |
| 9,078,284 B2 | 7/2015 | Richardson |
| 9,119,016 B2 | 8/2015 | Durand et al. |
| 9,185,545 B2 | 11/2015 | Yeoum et al. |
| 9,225,587 B2 | 12/2015 | Zhang et al. |
| 9,225,652 B2 | 12/2015 | Li et al. |
| 9,245,246 B2 | 1/2016 | Breitgand et al. |
| 9,298,515 B2 | 3/2016 | McMurry et al. |
| 9,301,333 B2 | 3/2016 | Choi et al. |
| 9,305,301 B2 | 4/2016 | Paul et al. |
| 9,306,909 B2 | 4/2016 | Koponen et al. |
| 9,311,108 B2 | 4/2016 | Cummings |
| 9,330,156 B2 | 5/2016 | Satapathy |
| 9,369,390 B2 | 6/2016 | Bantukul et al. |
| 9,391,897 B2 | 7/2016 | Sparks et al. |
| 9,392,471 B1 | 7/2016 | Thomas et al. |
| 9,401,962 B2 | 7/2016 | Parker et al. |
| 9,407,542 B2 | 8/2016 | Vasseur et al. |
| 9,436,443 B2 | 9/2016 | Chiosi et al. |
| 9,445,341 B2 | 9/2016 | Spinelli et al. |
| 9,450,817 B1 | 9/2016 | Bahadur et al. |
| 9,450,823 B2 | 9/2016 | Rhee et al. |
| 9,461,729 B2 | 10/2016 | Djukic et al. |
| 9,497,572 B2 | 11/2016 | Britt et al. |
| 9,503,969 B1 | 11/2016 | Zakaria et al. |
| 9,516,597 B2 | 12/2016 | Tabatabaei Yazdi et al. |
| 9,544,120 B2 | 1/2017 | Scholten et al. |
| 9,559,980 B2 | 1/2017 | Li et al. |
| 9,565,074 B2 | 2/2017 | Lehane et al. |
| 9,602,422 B2 | 3/2017 | Padmanabhan et al. |
| 9,853,898 B1 | 12/2017 | Subramanian et al. |
| 9,860,288 B2 | 1/2018 | Lockhart et al. |
| 9,961,016 B2 | 5/2018 | Ringland et al. |
| 10,034,222 B2 | 7/2018 | Zhang et al. |
| 10,039,006 B2 | 7/2018 | Shaw et al. |
| 10,103,991 B2 | 10/2018 | Agarwal et al. |
| 2003/0145106 A1 | 7/2003 | Brown et al. |
| 2003/0152034 A1 | 8/2003 | Zhang et al. |
| 2004/0071086 A1 | 4/2004 | Haumont et al. |
| 2004/0103308 A1 | 5/2004 | Paller et al. |
| 2007/0022191 A1 | 1/2007 | Miao |
| 2007/0140269 A1 | 6/2007 | Donnelli et al. |
| 2007/0259661 A1 | 11/2007 | Hurtta et al. |
| 2007/0294668 A1 | 12/2007 | Mohindra et al. |
| 2008/0285492 A1 | 11/2008 | Vesterinen et al. |
| 2009/0265542 A1 | 10/2009 | Khetawat et al. |
| 2009/0296827 A1 | 12/2009 | Karaoguz et al. |
| 2010/0017506 A1 | 1/2010 | Fadell |
| 2010/0234071 A1 | 9/2010 | Shabtay et al. |
| 2011/0116499 A1 | 5/2011 | Lim et al. |
| 2011/0182227 A1 | 7/2011 | Rune et al. |
| 2011/0238840 A1 | 9/2011 | Shi et al. |
| 2011/0282931 A1 | 11/2011 | Chen et al. |
| 2011/0292896 A1 | 12/2011 | Yeuom et al. |
| 2012/0087279 A1 | 4/2012 | Rinne et al. |
| 2012/0140749 A1 | 6/2012 | Caldwell et al. |
| 2012/0184266 A1 | 7/2012 | Faccin et al. |
| 2012/0236716 A1 | 9/2012 | Anbazhagan et al. |
| 2012/0303828 A1 | 11/2012 | Young et al. |
| 2013/0010756 A1 | 1/2013 | Liang et al. |
| 2013/0072199 A1 | 3/2013 | Miyagawa et al. |
| 2013/0337872 A1 | 12/2013 | Fertl et al. |
| 2014/0023044 A1 | 1/2014 | Sjölinder et al. |
| 2014/0059194 A1 | 2/2014 | Robb et al. |
| 2014/0070892 A1 | 3/2014 | Matsuoka et al. |
| 2014/0143378 A1 | 5/2014 | Bhupalam et al. |
| 2014/0254382 A1 | 9/2014 | Randriamasy et al. |
| 2014/0259012 A1 | 9/2014 | Nandlall et al. |
| 2014/0269435 A1 | 9/2014 | McConnell et al. |
| 2014/0307556 A1 | 10/2014 | Zhang et al. |
| 2014/0317293 A1 | 10/2014 | Shatzkamer et al. |
| 2014/0337500 A1 | 11/2014 | Lee |
| 2014/0349611 A1 | 11/2014 | Kant et al. |
| 2014/0376454 A1 | 12/2014 | Boudreau et al. |
| 2015/0109967 A1 | 4/2015 | Hogan et al. |
| 2015/0113100 A1 | 4/2015 | Tweedale et al. |
| 2015/0139238 A1 | 5/2015 | Pourzandi et al. |
| 2015/0146716 A1 | 5/2015 | Olivier et al. |
| 2015/0154258 A1 | 6/2015 | Xiong et al. |
| 2015/0172115 A1 | 6/2015 | Nguyen et al. |
| 2015/0188949 A1 | 7/2015 | Mahaffey et al. |
| 2015/0257012 A1 | 9/2015 | Zhang |
| 2015/0257038 A1 | 9/2015 | Scherzer |
| 2015/0295833 A1 | 10/2015 | Mizukoshi et al. |
| 2015/0296459 A1 | 10/2015 | Tabatabaei Yazdi et al. |
| 2015/0319078 A1 | 11/2015 | Lee et al. |
| 2015/0341187 A1 | 11/2015 | Diwane et al. |
| 2015/0350102 A1 | 12/2015 | Leon-Garcia et al. |
| 2015/0378753 A1 | 12/2015 | Phillips et al. |
| 2015/0382278 A1 | 12/2015 | Fallon et al. |
| 2016/0014787 A1 | 1/2016 | Zhang et al. |
| 2016/0021588 A1 | 1/2016 | Kamdar et al. |
| 2016/0021684 A1 | 1/2016 | Lewis et al. |
| 2016/0041427 A1 | 2/2016 | Wang et al. |
| 2016/0044136 A1 | 2/2016 | Schiff et al. |
| 2016/0062746 A1 | 3/2016 | Chiosi et al. |
| 2016/0073278 A1 | 3/2016 | Roessler et al. |
| 2016/0080484 A1 | 3/2016 | Earl |
| 2016/0088092 A1 | 3/2016 | Cardona-Gonzalez et al. |
| 2016/0094668 A1 | 3/2016 | Chang et al. |
| 2016/0095019 A1 | 3/2016 | Cui et al. |
| 2016/0095042 A1 | 3/2016 | Wadhwa |
| 2016/0105821 A1 | 4/2016 | Senarath et al. |
| 2016/0105893 A1 | 4/2016 | Senarath et al. |
| 2016/0112335 A1 | 4/2016 | Bouanen et al. |
| 2016/0112903 A1 | 4/2016 | Kaushik et al. |
| 2016/0113018 A1 | 4/2016 | Li |
| 2016/0127230 A1 | 5/2016 | Cui et al. |
| 2016/0127239 A1 | 5/2016 | Kahn et al. |
| 2016/0142282 A1 | 5/2016 | Guo |
| 2016/0142427 A1 | 5/2016 | De Los Reyes et al. |
| 2016/0149815 A1 | 5/2016 | Cotter |
| 2016/0150421 A1 | 5/2016 | Li et al. |
| 2016/0150448 A1 | 5/2016 | Perras et al. |
| 2016/0156513 A1 | 6/2016 | Zhang et al. |
| 2016/0164787 A1 | 6/2016 | Roach et al. |
| 2016/0174191 A1 | 6/2016 | Singh et al. |
| 2016/0182288 A1 | 6/2016 | MAenpÄÄ Jouni |
| 2016/0183156 A1 | 6/2016 | Chin et al. |
| 2016/0212017 A1 | 7/2016 | Li et al. |
| 2016/0218948 A1 | 7/2016 | Djukic |
| 2016/0218971 A1 | 7/2016 | Basunov |
| 2016/0219076 A1 | 7/2016 | Paczkowski et al. |
| 2016/0226791 A1 | 8/2016 | Ramamoorthy et al. |
| 2016/0248860 A1 | 8/2016 | Dunbar et al. |
| 2016/0249353 A1 | 8/2016 | Nakata et al. |
| 2016/0262044 A1 | 9/2016 | Calin et al. |
| 2016/0286043 A1 | 9/2016 | John et al. |
| 2016/0294732 A1 | 10/2016 | Chou et al. |
| 2016/0294734 A1 | 10/2016 | Jang et al. |
| 2016/0295614 A1 | 10/2016 | Lee et al. |
| 2016/0301566 A1 | 10/2016 | Ramasubramani et al. |
| 2016/0330140 A1 | 11/2016 | Cook et al. |
| 2016/0337180 A1 | 11/2016 | Rao |
| 2016/0352645 A1 | 12/2016 | Senarath et al. |
| 2016/0352924 A1 | 12/2016 | Senarath et al. |

(56) References Cited

U.S. PATENT DOCUMENTS

| | | |
|---|---|---|
| 2016/0353268 A1 | 12/2016 | Senarath et al. |
| 2016/0353422 A1 | 12/2016 | Vrzic et al. |
| 2016/0353465 A1 | 12/2016 | Vrzic et al. |
| 2016/0359682 A1 | 12/2016 | Senarath et al. |
| 2016/0373372 A1 | 12/2016 | Gillon et al. |
| 2016/0381146 A1 | 12/2016 | Zhang et al. |
| 2016/0381528 A1 | 12/2016 | Lee et al. |
| 2016/0381662 A1 | 12/2016 | Wang |
| 2017/0005390 A1 | 1/2017 | Zakaria et al. |
| 2017/0026887 A1 | 1/2017 | Sirotkin et al. |
| 2017/0034761 A1 | 2/2017 | Narayanan |
| 2017/0054595 A1 | 2/2017 | Zhang et al. |
| 2017/0064591 A1 | 3/2017 | Padfield et al. |
| 2017/0064666 A1 | 3/2017 | Zhang |
| 2017/0070892 A1 | 3/2017 | Song et al. |
| 2017/0078183 A1 | 3/2017 | Civanlar et al. |
| 2017/0079059 A1 | 3/2017 | Li et al. |
| 2017/0085493 A1 | 3/2017 | Senarath et al. |
| 2017/0086049 A1 | 3/2017 | Vrzic |
| 2017/0086118 A1 | 3/2017 | Vrzic |
| 2017/0104609 A1 | 4/2017 | McNamee et al. |
| 2017/0104688 A1 | 4/2017 | Mirahsan et al. |
| 2017/0105144 A1 | 4/2017 | Strand et al. |
| 2017/0150399 A1 | 5/2017 | Kedalagudde et al. |
| 2017/0164419 A1 | 6/2017 | Kim |
| 2017/0195229 A1 | 7/2017 | Ulas et al. |
| 2017/0201922 A1 | 7/2017 | Akiyoshi |
| 2017/0208011 A1 | 7/2017 | Bosch et al. |
| 2017/0237667 A1 | 8/2017 | Wang |
| 2017/0244598 A1 | 8/2017 | Crouse |
| 2017/0257276 A1 | 9/2017 | Chou et al. |
| 2017/0272978 A1 | 9/2017 | Giloh et al. |
| 2017/0279672 A1 | 9/2017 | Krishnan et al. |
| 2017/0300350 A1 | 10/2017 | Ferris |
| 2017/0302369 A1 | 10/2017 | Kwoczek et al. |
| 2017/0303189 A1 | 10/2017 | Hampel et al. |
| 2017/0308407 A1 | 10/2017 | Vaishnavi |
| 2017/0329639 A1 | 11/2017 | Morper et al. |
| 2017/0339567 A1 | 11/2017 | Li et al. |
| 2017/0353494 A1 | 12/2017 | Krinos et al. |
| 2018/0077024 A1 | 3/2018 | Zhang |
| 2018/0084518 A1 | 3/2018 | Cattoni et al. |
| 2018/0098246 A1 | 4/2018 | Hoffmann |
| 2018/0123932 A1 | 5/2018 | Shaw et al. |
| 2018/0124254 A1 | 5/2018 | Shaw et al. |
| 2018/0124592 A1 | 5/2018 | Ye et al. |
| 2018/0131578 A1 | 5/2018 | Cui et al. |
| 2018/0139129 A1 | 5/2018 | Dowlatkhah et al. |
| 2018/0160311 A1 | 6/2018 | Shaw et al. |
| 2018/0184311 A1 | 6/2018 | Fiaschi et al. |
| 2018/0205640 A1 | 7/2018 | Zhang |
| 2018/0248953 A1 | 8/2018 | Shaw et al. |
| 2018/0254920 A1 | 9/2018 | Shaw et al. |
| 2018/0302316 A1 | 10/2018 | Ubaldi et al. |
| 2018/0316799 A1 | 11/2018 | Shaw et al. |
| 2018/0332476 A1 | 11/2018 | Shaw et al. |
| 2019/0158676 A1 | 5/2019 | Shaw |
| 2019/0182328 A1 | 6/2019 | Shaw et al. |

FOREIGN PATENT DOCUMENTS

| | | |
|---|---|---|
| CN | 105516312 A | 4/2016 |
| CN | 105979542 A | 9/2016 |
| CN | 106257944 A | 12/2016 |
| JP | 5656803 B2 | 1/2015 |
| KR | 1473783 | 12/2014 |
| WO | 2000067449 | 11/2000 |
| WO | 2014071084 A2 | 5/2014 |
| WO | 2015198087 A1 | 12/2015 |
| WO | 2016051237 | 4/2016 |
| WO | 2016126238 A1 | 8/2016 |
| WO | 2016162467 A1 | 10/2016 |
| WO | 2016192639 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017058067 | 4/2017 |

OTHER PUBLICATIONS

"Network Slicing", ericsson.com, Apr. 12, 2017.

"Network Slicing for 5G Networks and Services", 5G Americas™, 5gamericas.org, Nov. 2016.

"The Edge of the Cloud 5G Technology Blog", edgeofcloud.blogspot.com, TechBlogger, pen, Apr. 8, 2017.

Biral, Andrea et al., "The Challenges of M2M Massive Access in Wireless Cellular Networks", Department of Information Engineering of the University of Padova, Mar. 27, 2015, 1-19.

Bor-Yaliniz, et al., "The new frontier in RAN heterogeneity: Multi-tier drone-cells", 2016, 9 pages.

Datta, Soumya K. et al., "Smart M2M Gateway Based Architecture for M2M Device and Endpoint Management", Internet of Things (iThings), 2014 IEEE International Conference on, and Green Computing and Communications. (GreenCom), IEEE and Cyber, Physical and Social Computing (CPSCom), IEEE. IEEE, 2014., 2014, 1-8.

Deak, Gabriel et al., "IOT (Internet of Things) and DFPL (Device-Free Passive Localisation) in a Disaster Management Scenario", Internet of Things (WF-IoT), 2015 IEEE 2nd World Forum on. IEEE, 2015., Aug. 2, 2012, 1-15.

Dhekne, et al., "Extending Cell Tower Coverage through Drones", 2017, 6 pages.

Ghavimi, Fayezeh et al., "M2M Communications in 3GPP LTE/LTE-A Networks: Architectures, Service Requirements, Challenges, and Applications", IEEE Communication Surveys & Tutorials, vol. 17, No. 2, Second Quarter 2015, May 9, 2015, 525-549.

Gramaglia, Marco et al., "Flexible connectivity and QoE/QoS management for 5G Networks: The 5G NORMA view", Communications Workshops (ICC), 2016 IEEE International Conference on. IEEE, 2016.

Le, Long B., "Enabling 5G Mobile Wireless Technologies", EURASIP Journal on Wireless Communications and Networking 2015.1 (2015): 218., 2015, 1-14.

McCullough, Don, "Why 5G Network Slices?", ericsson.com, Feb. 17, 2015.

Nikaein, Navid et al., "Network store: Exploring slicing in future 5g networks", Proceedings of the 10th International Workshop on Mobility in the Evolving Internet Architecture, ACM, 2015.

Novo, Oscar et al., "Capillary Networks—Bridging the Cellular and IOT Worlds", Internet of Things (WF-IoT), 2015 IEEE 2nd World Forum on. IEEE, 2015., 2015, 1-8.

Open Networking Foundation, "TR-526 Applying SDN Architecture to 5G Slicing", Issue 1, Apr. 2016, 1-19.

Podleski, Lukasz et al., "Multi-domain Software Defined Network: exploring possibilities in", TNC, 2014.

Sayadi, Bessem et al., "SDN for 5G Mobile Networks: NORMA perspective", International Conference on Cognitive Radio Oriented Wireless Networks. Springer International Publishing, 2016.

400

500

METHOD AND APPARATUS FOR ADAPTIVE CHARGING AND PERFORMANCE IN A SOFTWARE DEFINED NETWORK

CROSS REFERENCE TO RELATED APPLICATIONS

This application is a continuation of U.S. application Ser. No. 15/340,700, filed Nov. 1, 2016, which is incorporated herein by reference in its entirety.

FIELD OF THE DISCLOSURE

The subject disclosure relates to a method and apparatus for adaptive charging and performance in a software defined network.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1:
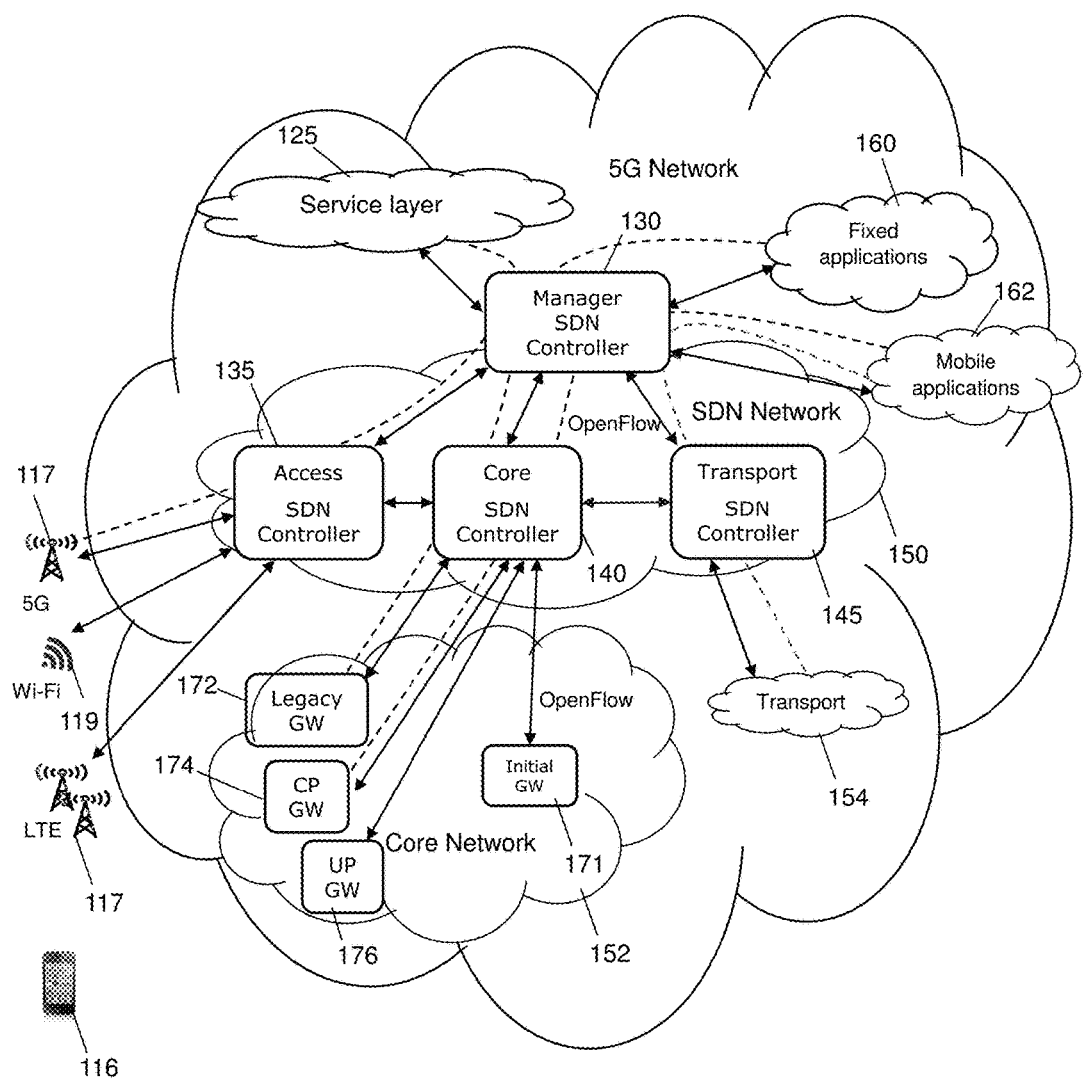
FIG. 1 depicts illustrative embodiments of an exemplary software defined network for providing services to communication devices.

The subject disclosure describes, among other things, illustrative embodiments for adapting charging and performance of a Software Defined Network (SDN) of a communication network to provide services to communication devices. A SDN Controller can instantiate a Virtual Network Function (VNF) into the SDN Network for providing a Network Resource. The SDN Controller can receive and processor requests for services from a communication device. The SDN Controller can access data usage information for a subscriber account associated with the communication device and can determine if the subscriber account is at or near a data network data limit. If the account is at or near limit, then the SDN Controller can determine a course of action from a preference profile. The SDN Controller can notify the communication device and ask if the subscriber wants to increase the limit (for a fee). The SDN Controller can also determine if the preference profile directs a modification in data delivery to the communication device as a result of the overage. If the preference profile directs a modification, then the SDN Controller can modify the performance of the VNF element or some other element in the SDN Network. The SDN Controller can generate a charge for the performance modification and forward this charge to a billing function in the network.

One or more aspects of the subject disclosure include a machine-readable storage medium, including executable instructions that, when executed by a processing system including a processor, facilitate performance of operations, including instantiating a first virtual network function to provide a network resource in a network. The operations can also include receiving, from a communication device via the network, a request to facilitate a service to a first communication device. The operations can also include accessing data usage information associated with the first communication device responsive to receiving the request to facilitate the service and, in turn, determining whether the first communication device exceeds a data limit threshold according the data usage information. The operations can include accessing a first data limit instruction associated with the first communication device responsive to determining that the first communication device exceeds the data limit threshold. The operations can also include transmitting a notification to the first communication device that the data limit threshold has been exceeded according to the first data limit instruction and, in turn, receiving, from the first communication device, a response to the notification that the data limit threshold has been exceeded. The operations can include determining a modification to the first virtual network function according to the response to the notification and, in turn, communicating with the network to cause the modification to the first virtual network function. The operations can further include determining a charging instruction according to the modification to the first virtual network function and, in turn, transmitting the charging instruction to the network.

One or more aspects of the subject disclosure include a software defined network controller, comprising a processing system including a processor and a memory that stores executable instructions that, when executed by the processing system, facilitate performance of operations, including accessing data usage information associated with facilitation of a service to a communication device via a network and, in turn, determining whether the communication device exceeds a data limit threshold according the data usage information. The operations can include accessing a data limit instruction associated with the communication device responsive to determining that the communication device exceeds the data limit threshold. The operations can further include detecting an authorization for a charge associated with exceeding the data limit threshold. The operations can also include determining a modification to a first virtual network function associated with the facilitation of the service according to the data limit instruction and responsive to the authorization for the charge associated with exceeding the data limit threshold. The operations can include communicating with the network to cause the modification to the first virtual network function. The operations can also include determining a charging instruction according to the modification to the first virtual network function and, in turn, transmitting the first charging instruction to the network.

One or more aspects of the subject disclosure include a method including instantiating, by a processing system include a processor, a virtual network function to provide a network resource in the network. The method can include accessing, by the processing system, data usage information associated with facilitation of a service to a communication device via the network. The method can also include determining, by the processing system, whether the communication device exceeds a data limit threshold according the data usage information. The method can further include accessing, by the processing system, a data limit instruction associated with the communication device responsive to determining that the communication device exceeds the data limit threshold. The method can include determining, by the processing system, a modification to the virtual network function associated with the facilitation of the service according to the data limit instruction. The method can also include communicating, by the processing system, with the network to cause the modification to the virtual network function.

In a communication network, communication services are typically provided by vendor equipment, which is custom made and/or configured during installation to provide functions necessary for providing desired services. When changes are made to the network, service instantiation and management can require substantial labor to accommodate and/or incorporate new equipment, which may result delayed service instantiation and a system that demonstrates poor dynamic response to changes in network demand. In addition, network flows are generally controlled by a control plane that is associated with the vendor equipment. However, the control plane is often integrated with the data or user plane such that changes to a network element may require re-definition or reconfiguration of a service.

Operation support systems ("OSS") can currently be used to create and/or configure services. However, the process for determining system needs and instantiating equipment can be slow (non-dynamic) and labor intensive, where the service is defined and specified, configured for a chosen vendor network element, coded into a software architecture, and tested.

Some communication network providers are turning to Software Design Network (SDN) solutions to improve network flexibility and change dynamics. For example, network providers may use a SDN controller for provisioning resource and capacity for a mobility core network. However, in these configurations, the core network is a fixed asset within the communication network. SDN controller provisioning can alter performance or control plane assignment of mobility core network components but does not create a fully distributed and dynamically responsive system nor a system that can predict and provide capacity and resource requirements.

Referring now to FIG. 1, illustrative embodiments of an exemplary communication network for providing services to communication devices is shown. In one or more embodiments, a communications system 100 can include a Software Defined Network (SDN), or SDN Network 150. The SDN Network 150 can be controlled by one or more SDN Controllers. For example, the SDN network 150 can include a Manager SDN Controller 130, an Access SDN Controller 135, a Core SDN Controller 140, and/or a Transport SDN Controller 145. The functions of the different types of SDN Controllers 130-145 are further described below. Each SDN Controller, such as, for example and ease of illustration, the Manager SDN Controller 130, can be provided by a computing system executing computer-executable instructions and/or modules to provide various functions. In one or more embodiments, multiple computer systems or processors can provide the functionality illustrated and described herein with respect to each SDN Controller 130. To simplify the description of the concepts and technologies described herein, each SDN Controller 130 is illustrated and described herein as being provided by a single computing system. However, it should be understood that this example is illustrative and therefore should not be construed as being limiting in any way.

In one or more embodiments, each SDN Controller 130 can include various components and/or can be provided via cooperation of various network devices or components. For example, each SDN Controller 130 can include or have access various network components or resources, such as a network resource controller, network resource autonomous controller, a service resource controller, a service control interpreter, adapters, application programming interfaces, compilers, a network data collection and/or analytics engine. Each SDN Controller 130 also can include or access information describing available resources and network information, such as network object statistics, events or alarms, topology, state changes. In one or more embodiment, each SDN Controller 130 can use and/or can generate and/or access system configurations, including configurations of resources available to the Manager SDN Controller 130 for proving access to services.

In one or more embodiments, the communication system 100 can include a Service Layer 125. The Service Layer 125 can provide access to third-party services and applications at a higher application layer. The Service Layer 125 may include capability servers, owned by the operator of the communication network 100, that can access and provide access to application layer servers owned by third-party content providers via open and secure Application Programming Interfaces (APIs). The Service Layer 125 can also provide an interface to a Core Network 152. The communication network 100 can also include access to Applications, such as Fixed Applications 160 and Mobile Applications 162.

In one or more embodiments, the communication network 100 can include an SDN Network 150. The SDN Network 150 can include multiple SDN Controllers 130, 135, 140 and 145. The SDN Controllers 130, 135, 140 and 145 can provide different types of functions and can be arranged in virtual layers. For example, the SDN Network 150 can include a Manager SDN Controller 130 that controls and coordinates functioning of the SDN Network 150. The Manager SDN Controller 130 can be a top-level Management System in the architecture. Below the Manager SDN Controller 130, a next level of SDN Controllers 135, 140 and 145 can be instantiated and configured by the Manager SDN Controller 130 to provide specific classes of functionality in the architecture. For example, the Manager SDN Controller 130 can provide level 3 functionality to control and coordinate service control, configuration, and data flow in the communication network 100. The Manager SDN Controller 130 can, as needed, instantiate, configure, and direct level 2 SDN Controllers 135, 140 and 145 for controlling Access, Core, and Transport capabilities in the communication network 100.

In one or more embodiments, the SDN Network 150 can allow the communication network 100 to separate control plane operations from a data plane operations and can enable layer abstraction for separating service and network functions or elements from physical network functions or elements. In one or more embodiments, the Manager SDN Controller 130 can coordinated networking and provision of applications and/or services. The Manager SDN Controller 130 can manage transport functions for various layers within the communication network and access to application functions for layers above the communication network. The Manager SDN Controller 130 can provide a platform for network services, network control of service instantiation and management, as well as a programmable environment for resource and traffic management. The Manager SDN Controller 130 also can permit a combination of real time data from the service and network elements with real-time or near real-time control of a forwarding plane. In various embodiments, the Manager SDN Controller 130 can enable flow set up in real-time, network programmability, extensibility, standard interfaces, and/or multi-vendor support. In one embodiment, interactions between layers of the communication network 100 can be based upon policies to determine optimum configuration and rapid adaptation of the network 100 to changing state and changing customer requirements for example, predicted demand, addition of new users, spikes in traffic, planned and unplanned network outages, adding new services, and/or maintenance.

In one or more embodiments, the SDN Network 150 can support legacy and emerging protocols through the use of adapters, including, but not necessarily limited to, configurator or adapters that can write to the network elements, and listening adapters that can collect statistics and alarms for the data collection and analytic engine as well as for fault and performance management. Modularity of the Manager SDN Controller 130 can allow the enable functions, such as compiling, service control, network control, and data collection and analytics to be optimized and developed independently of the specific vendor network equipment being controlled.

In one or more embodiments, the SDN Network 150 can enable separation of service control from network resource control. This separation can enable abstraction of service definitions from particular types of network resources that are selected and used for implementation of services. For example, a service can be defined by the Manager SDN Controller 130 independently of actual network layer and vendor specifics. Access service features can be separated from flow service features and can thereby connect to different types of flow services quickly. In one embodiment, customers can access services over a connection that can be added, removed, evolved, combined, or otherwise modified and that may no longer be tied to the service. In one or more embodiments, the Manager SDN Controller 130 can creation of a set of saved configurations, templates, and/or building blocks for creating and providing a service. A customer can pick an access path (e.g., DSL, Broadband, Private Line, IP, VPN, etc.) that is independent of a service that has been selected. In one embodiment, this approach can provide several benefits such as, for example, more rapid instantiation of network elements and addition of new services, matching network features, performance, and capabilities to customer needs on-demand, and allocation of network resources for an individual customer while maintaining network and operational efficiencies.

In one or more embodiments, each SDN Controller 130-145 can instantiate a virtualized environment including compute, storage, and data center networking for virtual applications. For example, the Manager SDN Controller 130 can direct on-demand instantiation of network elements at on-demand locations to support network services for a customer or for the autonomous network resource controller where capacity is needed or where backup of network elements due to failures. Service functions can be moved and/or changed in response to traffic flow rather than traffic flow moving to the desired service functions.

In one or more embodiments, the Manager SDN Controller 130 can cooperate with a cloud orchestrator in instantiating level 2 SDN Controllers 135-145 and network services to support the network configuration in connecting Virtual Machined (VMs) that the cloud orchestrator is setting up. The network instantiation and configuration can include configuration of the virtual networks, which may operate at various physical levels in a cloud server architecture, including hypervisor, top of rack, cloud network fabric, and/or IP provider edge, which can connect the cloud network with the service provider WAN network. In one or more embodiments, the level 2 SDN Controllers 135-145 can cooperate with a cloud orchestrator in instantiating Virtual Network Functions (VNFs) for use in, for example, the Core Network 152.

In one or more embodiments, the SDN Controllers 130-145 can be configured to access information describing models of services that can be provided to communication devices. Formal data models and/or templates can be inputs into the network resource controller, which can compile and create the actual steps necessary to configure the vendor specific network elements. The formal information data or models can enable separation of service definitions from vendor specific implementations. In one or more embodiments, for example, the Manager SDN Controller 130 can use service and networking templates stored at or accessible to the Manager SDN Controller 130 and assemble a service from the templates. The Manager SDN Controller 130 can also translate information data and/or models describing services into programmable logic modules, where a programmable logic language can be used to define service and network templates. These templates can be matched to the desired service features, the matched templates can be assembled by the Manager SDN Controller 130. The template-based service representation can be compiled by the software defined network controller, and the compiled template-based service representation can be validated using emulated field test environments to validate the service. After validation, the service can be ready for instantiation on the network and the Manager SDN Controller 130 can interact with network elements to deploy the service and/or can issue commands to effect the deployment.

In one or more embodiments, a communication device 116 can operate in communication with and/or as a part of a communications network 100. The functionality of the communication device 116 may be provided by one or more server computers, desktop computers, mobile telephones, smartphones, laptop computers, set-top boxes, other computing systems, and the like. It should be understood that the functionality of the communication device 116 can be provided by a single device, by two similar devices, and/or by two or more dissimilar devices. For purposes of describing the concepts and technologies disclosed herein, the communication device 116 is described herein as a workstation or personal computer. It should be understood that this embodiment is illustrative, and should not be construed as being limiting in any way.

The communication device 116 can execute an operating system and one or more application programs. The operating system can be a computer program that controls the operation of the communication device 116. The application programs can be executable programs that are configured to execute on top of the operating system to provide various functions. According to various embodiments, the application programs can include web browsers, productivity software, messaging applications, combinations thereof, or the like. In one or more embodiments, the application programs of the communication device 116 can include applications that enable interactions between the communication device 116 and other devices or entities. In some contemplated embodiments, the application programs can provide functionality for interacting with and/or communicating with the communication network 100 and, in turn, having communications analyzed by the Manager SDN Controller 130 or, alternatively, any of the SDN Controllers 130-145 in the SDN Network 150.

According to various embodiments, the SDN Network 150 can include and/or access resources, such as a service orchestrator, a software defined network controller, a cloud orchestrator 116, and/or other elements. It should be understood that the Manager SDN Controller 130, and any of the above-described components, or combinations thereof, may be embodied as or in stand-alone devices or components thereof operating as part of or in communication with the communication network 100. As such, the illustrated embodiment should be understood as being illustrative of only some contemplated embodiments and should not be construed as being limiting in any way.

In one or more embodiments, the SDN Network 150 can enable a shortened service conception-to-deployment timeline, as well as enabling improved service management functionality. In particular, the Manager SDN Controller 130 can receive or obtain the service request from the communication device 116 or from any other requesting source. According to various embodiments, the service request can be received as a request to order. In one embodiment, the service request can be in the form of a programming language file, which can be written in various languages and/or can include various types of models or the like. In some contemplated embodiments, the service request is provided by one or more Yang files, one or more XML files, one or more hypertext markup language ("HTML") files, one or more scripts and/or programming language files, files in other languages or formats, combinations thereof, or the like.

In one or more embodiments, the SDN Network 150 can automatically evaluate application service requirements that have been requested from the communication system 100. In one embodiment, a service request can be received from a customer or customer device. For example, a request can be receive via a portal. The service request can be provided to the soft Manager SDN Controller 130 for service creation, instantiation, and management. According to various embodiments, the service request can be analyzed by the Manager SDN Controller 130. In one embodiment, the Manager SDN Controller 130 can access or query the Service Layer 125 to determine service requirements needed for fulfilling the service request.

In one or more embodiments, a service request can be received by a customer (e.g., via the portal), and provided to the software defined network controller for service creation, instantiation, and management. The service request can include application objects and/or requests for particular services or functions. Thus, the service request can include objects that define service functions that are desired, requests for generation of services and/or requests for particular functionality, queries, combinations thereof, or the like. It should be understood that these examples are illustrative and therefore should not be construed as being limiting in any way. According to various embodiments, the service request can be analyzed by the software defined network controller and a set composed of a directed graph and the associated model or model files are selected. The model can define features of the service and can generate in a programming language or format such as XML, Yang models, other types of files, combinations thereof, or the like. The selected directed graph can be used at runtime to fill in the event-specific details from the application programming interface ("API"), the resource allocations per the directed graph and the resource model, and one or more state changes in the network through the adapters.

In one or more embodiments, the Manager SDN Controller 130 can include, expose, and/or communicate with a portal 120. The functionality of the portal 120 can be provided, in various embodiments, by an application hosted and/or executed by a computing device such as a server computer, a web server, a personal computer, or the like. In some other embodiments, the functionality of the portal can be provided by a module or application hosted or executed by one or more computing devices. Thus, it can be appreciated that the functionality of the portal can be provided by a hardware or software module executed by one or more devices that provide the software defined network framework and/or by other devices. Because the portal can be provided in additional and/or alternative ways, it should be understood that these examples are illustrative and therefore should not be construed as being limiting in any way.

In one or more embodiments, the communication device 116 can communicate with the communication network 100 via a wireless communication link. For example, the communication device 116 can be a mobile communication device 116 that communications via a cellular communication link through a Radio Access Network (RAN) technology. A mobility network 117, such as an LTE network or a 5G network can establish wireless communications with the communication device 116, where the communication device 116 can move from cell to cell while maintaining a communication session. In another example, the communication device 116 can communication with the communication network via a WiFi network 119 link. The WiFi network 119 can be, for example, a local area network (LAN) that is supported by a router capable of wireless communications or can be an individual device, such another mobile communication device 116 capable of acting as an intermediary (e.g., a Hot Spot). In one or more embodiments, the communication network 100 can be a converged network capable of supporting a wide range of access, core and transport networks, such as wireline, wireless, satellite, 3GGP, non-3GPP, and/or 5G.

In one or more embodiments, the communication device 116 can establish a session with a portal. The portal can be a function of an application that is resident at the communication device 116 as a stand-alone application or as a client application to a server application of the network 100 or a third party. The portal functionality enables the communication device 116 to define or request particular service features either directly or indirectly. According to various embodiments, the communication device 116 can provide to the portal, or can define via the portal, a service request. In one or more embodiments, the service request can include service feature data that represents service features desired or needed in a service being created and/or instantiated via the Manager SDN Controller 130. Alternatively, the service request can be a bare request for access to a service. In this case, the Manager SDN Controller 130 can determine the nature of the service and the functionality/resources required for providing the service.

In one or more embodiments, the Manager SDN Controller 130 can query the Service Layer 125 to determine the functional and/or resource requirements to provide the service to the communication device 116. In one or more embodiments, the service requirements can include service feature data. In one or more embodiments, this service feature data can be generated by or provided to the Service Layer 125 and/or the Manager SDN Controller 130 via interactions between the communication device 116 and the portal. For example, in the process of making the service request, the communication device 116 can make a series of selections from menus, drop-down lists, fields, tables, or other data or object selection mechanisms that may be provided by the portal and/or the application programs executing on the communication device 116. In some embodiments, the application programs can include a web browser application or other application that can obtain data from the portal. In one or more embodiments, the application programs can use the data to generate and present a user interface at the communication device 116. The user interface can include possible service features, and a user or other entity can select the desired features, drag and drop desired features, and/or otherwise indicate desired features in a service.

In one or more embodiments, regardless of the specific technique for capturing and/or deriving service features, using interactions between the communication device 116 and the portal, and the service feature data can represent feature choices or definitions made. In one embodiment, the portal can be configured to obtain the service feature data and to generate and/or output the service data as a programming file or in a programming file format. In one embodiment, the portal can be supported or directed by the Manager SDN Controller 130. It should be understood that these examples are illustrative and therefore should not be construed as being limiting in any way.

In one or more embodiments, the SDN Network 150 can analyze the service data or information and identify service features indicated by and/or associated with the requested service. Based upon the service request and/or service data, the Manager SDN Controller 130 can identify one or more service features associated with a service. As used herein, a "service feature" can be used to refer to an operation, a set of operations, a process, a method, a combination thereof, or the like associated with a service. Thus, for example, if the service provides the ability to check an email service for new messages, the feature identified by the Manager SDN Controller 130 can correspond to checking for new email messages. It therefore can be appreciated that any function, functionality, set or subset of functions or functionality, processes or set of processes, method flows, work flows, combinations thereof, or the like can correspond to a service feature. As such, the above example should be understood as being illustrative of one example feature and therefore should not be construed as being limiting in any way.

In one or more embodiments, the Manager SDN Controller 130 can analyze the service request and/or other implementation of the service data to identify each of one or more features associated with the requested service. The identification of service features can be iterated by the Manager SDN Controller 130 until each feature is identified. Upon determining that additional features associated with the service do not remain, the Manager SDN Controller 130 can generate and select a service model, template, and/or program that represents the requested service. In one embodiment, the Manager SDN Controller 130 can receive a service model.

In one or more embodiments, the Manager SDN Controller 130 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

In one or more embodiments, the Manager SDN Controller 130 can determine from the service model one or more physical network functions or other resources that will be needed or used to support the service. The Manager SDN Controller 130 also can analyze the service model to identify one or more virtual network functions or other functions that will support or provide the features of the service. The Manager SDN Controller 130 also can determine, via analysis of the service model, process flows between the various resources and/or functions used to support or provide the service features.

In one or more embodiments, the Manager SDN Controller 130 can select service and networking templates stored at or accessible to the Manager SDN Controller 130. Features requested in the service request can be matched to the templates, and the Manager SDN Controller 130 can assemble a service from the templates. In one embodiment, the Manager SDN Controller 130 can compile the assembled templates and with a real time network map, create a directed graph that can configure the network elements based on a specific sequence defined by the directed graph. Upon successful validation, the Manager SDN Controller 130 can interact with network elements such as a service orchestrator and a cloud orchestrator to instantiate resources for performing functions, including computing, storage, and local networking in a virtual environment, and to instantiate the service. In one or more embodiments, the Manager SDN Controller 130 can configure physical and virtual network functions and a cloud orchestrator can instantiate the virtual network functions (e.g., virtual machines ("VMs")). After virtual network function instantiation, the Manager SDN Controller 130 can configure, monitor, and manage the service. In one or more embodiments, the Manager SDN Controller 130 can receive or get events from the network and trigger a directed graph to execute the logic of the intended service, feature, or flow.

In one or more embodiments, the Manager SDN Controller 130 of the SDN Network 150 can automatically prioritize and instantiate the next lower level (e.g., level 2) SDN controller including an Access Network SDN Controller 135, a Core Network SDN Controller 140, and/or a Transport Network SDN Controller 140 on the fly. Generally, the Manager SDN Controller 130 can instantiating at least one set of these level 2 SDN Controllers 135-145 to provide baseline functionality and connectivity for a least one communication device 116. As server requests are processed, the Manager SDN Controller 130 can evaluate the service request requirements (i.e., the service features) and compare the required resources and capacities for these resources with the resources and capacities currently available at the SDN network 150 via the level 2 SDN Controllers 135-145.

In one embodiment, the Manager SDN Controller 130 can communicate with each of the instantiated SDN controllers via a communication interface, such as an OpenFlow interface. In addition, the SDN Controllers 135-145 of level 2 to can communicate among themselves to determine resource capabilities, capacities, shortages, failures, and/or warnings. In one or more embodiments, if the Manager SDN Controller 130 determines that the requested service can be performed, within system margins, using the currently instantiated SDN Controllers 135-145, then the Manager SDN Controller 130 can decide to direct the SDN Controllers 135-145 to perform the service for the communication device 116. Alternatively, if the Manager SDN Controller 130 determines a shortage or shortfall in a needed resource, then the Manager SDN Controller 130 can direct instantiation of one or more new SDN Controller 135-145 for performing all or part of the requested service. For example, the Manager SDN Controller 130 may determine that the service request associated with the communication device 116 or many communication devices 116 or merely received at the communication network 110 from an indeterminate device (e.g., a request for resources from another network) requires additional Core SDN Controller capacity 140. In this case, the Manager SDN Controller 130 can direct the instantiation of additional Core SDN Controller 140 capacity from a set of configurable SDN Controller devices at the cloud.

In one or more embodiments, level 2 SDN Controllers 135-145, including Access SDN Controller 135, Core SDN Controller 140, and Transport SDN Controller 145 can control devices at level 1 of the communication network 100. For example, the Access SDN Controller 135 can control, direct, configure, and monitor Access Resources 117 and 119 for the network 100, such as eNodeB controllers, RAN controllers, and or WiFi controllers. In another example, the Core SDN Controller 140 can control, direct, configure, and monitor Core Resources 172-178 for the Core Network 152 of the communication network 100, such as Gateways (GW) for Control Plane (CP) 174, User Plane (UP) 176, Legacy (i.e., combined user and control plane) 172. In another example, the Transport SDN Controller can control, direct, configure, and monitor Transport Layer services 154, such as a Multiprotocol Label Switching (MPLS) network, Fiber Optics network, and/or a Backbone network.

In one or more embodiments, the level 3 Manager SDN Controller 130 can manage one or more sets of level 2 SDN Controllers 135-145 in the SDN Network 150. The Manager SDN Controller 130 can configure and/or reconfigure the instantiated SDN Controllers 135-145 to optimize the SDN Network 150 according to loading created by the service requests. For example, the Manager SDN Controller 130 can invention automatically instantiate multiple levels of fully distributed SDN Controllers 135-145. Likewise the level 2 SDN Controllers 135-145 can instantiate and/or configure and/or reconfigure VNF elements 171-176 at level 1. Each of the SDN Controllers 130-145 can support instantiation "on the fly" based on new requests, the ending of old requests, monitoring network traffic, and/or requesting loading information from any of the other SDN Controllers 135-145 and/or the VNF elements 171-176. For example, the Manager SDN Controller 130 can instantiate and/or decommission SDN Controllers 135-145 into and out from the SDN Network 150 on an on-going basis according to the exchange-to-exchange (E2E) application service requirements. Similarly, the SDN Controllers 135-145 can instantiated and/or decommission and/or reconfigure VNF elements 171-176. For example, in a streaming media application, such as a Netflix™ Video Delivery application, the Manager SDN Controller 130 can determine that network demands for the Access SDN Controller 135 and Transport SDN Controller 145 may be relatively large for a given set of communication devices 116, while the Core SDN Controller 140 demands for these communication devices 116 may be relatively normal. The Manager SDN Controller 130 can look at the available resources and capacities for the currently instantiated SDN Controllers 135-145 that are support these communication devices 116. If the demands of the media streaming application exceed the available resources, then the Manager SDN Controller 130 can automatically address the issue by, for example, instantiating additional Access SDN Controller 135 and Transport SDN Controller 145 resources.

In one or more embodiments, the Manager SDN Controller 130 may determine that sufficient resources exist at the currently instantiated Access SDN Controller 135 and Transport SDN Controller 145 resources, however, the priorities of these resources need to be adjusted. For example, where a heavy streaming media loading is identified, the Access SDN Controller 135 and Transport SDN Controller 145 resources may be given higher priority in comparison to the Core SDN Controller 140. Conversely, if a heavy loading of Voice over IP (VoIP) services is identified, then the Manager SDN Controller 130 can automatically place the Core Network SDN Controller 140 into higher priority in comparison to Access Network SDN Controller 135 and Transport Network SDN Controller 145.

In one or more embodiments, the SDN Controller 130-145 can decide how to use network resources to fulfill the data needs. For example, the Manager SDN Controller 130 can communicate, directly, with the SDN Controllers 135-145 on level 2 (e.g., via Open Flow) and indirectly with the Network Function Virtualization resources on the level 1. In one or more embodiments, the Manager SDN Controller 130 can access service level information associated with the communication devices 116. The Manager SDN Controller 130 can determine if the communication device 116 is associated with a premium service level, for example, and can instantiate additional resources and/or adjust priority levels of currently instantiated resources to provide requested services according to Quality of Service (QoS) levels associated with the service level.

In one or more embodiments, the SDN Controllers 130-145 can access historical information or prospective information to predict resources that may be needed at a time in the future. For example, the Manager SDN Controller 130 can access historical resource demand information associated with the network 100 and/or a particular part of the network. For example, the Manager SDN Controller 130 can determine that the demand for streaming media resources is likely to be very high on a particular day of the week, because historical data indicates that this day is a popular day of the week for streaming data. In another example, the Manager SDN Controller 130 can make this type of predictive determination for a particular communication device 116 or set of devices 116 based on historical data. In another example, the Manager SDN Controller 130 can access a database with information on triggers that correspond to increased or decreased levels of usage (above or below mean usage). For example, the database may include information on a release of a several season of a popular program for access via streaming media. The data may further indicate a high probability for massive streaming of data associated with this program beginning at a certain time. By analyzing and responding to these indicators of out-of-typical usage, the Manager SDN Controller 130 can instantiate additional resources or, if warranted, decommission resources (or reassign to other uses).

In one or more embodiments, the SDN Controllers 130-145 can store models, templates, programs, and/or configurations associated with providing services to communication devices via the communication network 100. For example, if a communication device 116 includes a High Definition camera devices, and if the user off the communication device 116 decides to upload data from the High Definition camera function to, for example, a cloud-based storage location accessible via the communication network, then the Manager SDN Controller 130 can determine the needed resources and priority settings. Based on the setup, and optionally, on analysis of the performance of the system during the upload of the data, the Manager SDN Controller 130 can determine that the entire setup should be saved for later use.

In one or more embodiments, the SDN Controllers 130-145 can receive real time feedback from network resources during operation. For example, the Manager SDN Controller 130 can receive information from the SDN Controllers 135-145 of the level 2. Alternatively, the Manager SDN Controller 130 can receive information, indirectly, from the level 1 resources and VNF devices. The Manager SDN Controller 130 can use the feedback information to determine the status of the resources that have been assigned by the Manager SDN Controller 130 to provide services. The Manager SDN Controller 130 can determine, for example, that insufficient resources have been instantiated and/or prioritized for a task or for one or more communication devices 116. The Manager SDN Controller 130 can then direct the instantiation of additional SDN Controllers 135-145 and/or alteration in configuration and/or priority of SDN Controllers 135-145. Conversely, the Manager SDN Controller 130 can determine that too many resources have been dedicated and decide to either decommission and/or reassign the resources to thereby provide on-the-fly and dynamic response.

In one or more embodiments, each of the Level 2 SDN Controllers 135-145 can instantiate required VNFs on-the-fly, in order to fulfill E2E service delivery. In one or more embodiments, rather than leveraging a single level SDN Controller, many SDN Controllers 130 and 135-145 can be used to achieve multiple levels of SDN control and management.

In one or more embodiments, the SDN Network 150 can respond to a request for a service from a communication device 116 by coordinating and/or implementing a process for the communication device 116 to access the service. In various embodiments, any of the SDN Controllers 130-145 can be responsible for the process. However, for simplicity of illustration, a non-limiting embodiment featuring a SDN Core Controller 140 is described below. In one or more embodiments, the Core SDN Controller 140 can determining if the communication device 116 is authenticated to the network 100 and/or authorized to receive the requested service. For example, the Core SDN Controller 140 can receive and process a request for service by querying an authentication server. For example, the Core SDN Controller 140 can query a Home Subscription Server (HSS) for authentication of the subscription status of the communication device 116. The Core SDN Controller 140 can further determine if the communication device 116 is authorized for accessing a requested service, such as streaming of video content, by accessing a user profile associated with the communication device 116. For example, the Core SDN Controller 140 can determine if the communication device 116 is participating in a data access plan and, if so, the terms of the data access plan. The Core SDN Controller 140 can access information at equipment of the Service Layer 135 and/or specific Mobile Applications 162 and/or Fixed Applications 160 to determine if the communication device 116 is authorized for a specific service, such as specific video streaming service. In one example, the Core SDN Controller 140 can verify if a client-server relationship between the communication device 116 and an application service.

In one or more embodiments, the Core SDN Controller 140 can access user preference information for the communication device 116. In one embodiment, the Core SDN Controller 140 can fetch and look up a profile of one or more users of the communication device 116. The profile can include information on how the user and/or a subscriber to system services desires to manage data resources. For example, a network provider or system operator can sell access to services of the communication system 100 to various types of subscribers. In one embodiment, a customer agreement can specify resources and services that are available and how the subscriber is charged for use of those resources. The customer agreement may specify certain limitations on access or usage of resources, such as, limits on reception of data from the network 100. In a typical arrangement, the subscriber may pay a monthly fee that corresponds to a monthly allotment of data. If the subscriber uses more than the allotted data, then the subscriber may incur additional fees beyond the normal monthly fee. In another typical arrangement, the communication device 116 may be linked to not only a subscriber but a group of subscribers and communication devices 116 operating under a family or enterprise customer agreement. In this scenario, the group of communication devices 116 may be operating under a set of group limitations on services, including an aggregated data limit, where every communication device 116 may share in using all of the available resources that have purchased for the group, but where all devices in the group reaches a plan limitation at the same time (e.g., a data limit). The In one or more embodiments, the Core SDN Controller 140 can retrieve information regarding prior instances of a subscriber or a subscription group (e.g., a family) responding to instances of approaching or exceeding data/resource limitations. For example, during a prior month, the subscriber may have exceeded a prearranged data limitation for the subscription service. At that time, the communication device 116 of the subscriber may have been notified by the Core SDN Controller 140 of a potential overage in data usage and may have contacted the system 100, via a portal, to request additional data resources for the monthly service period. The network 100 can track these types of instances, including those where the subscriber paid for more data, up front, in anticipation of an overage, paid for additional data at the time of notification of an impending overage, chose to disable data usage at the time the notification of an impending overage, and the like.

In one or more embodiments, the Core SDN Controller 140 can access this historical information and can apply an artificial intelligence approach to deduce subscriber preferences for handling these types of scenarios based on the past occurrences. The Core SDN Controller 140 can also request from the subscriber in-advance instructions for handling situations of overage or near overage. For example, the Core SDN Controller 140 can present to the subscriber, via a portal, a set of scenarios and request for the user to decide, in advance, how best to handle these scenarios in keeping with their preferences. For example, the subscriber may direct that the Core SDN Controller 140 can direct the system to purchase a certain amount of additional data upon the system sending a notification of impending overage if certain other criteria are met. These criteria can include, for example, proximity to the end of the monthly billing/usage cycle, the type of service that is dominant in the generation of data usage (e.g., Is it video streaming or email access?), which communication device 116 is dominant in the generation of the data usage (e.g., a parent's device or a child's device). The Core SDN Controller 140 can analyze these past situations and any forward-looking directives that have been provided by the subscriber to derive one or more experience-based directives for handling overages and near-overages. In one embodiment, the Core SDN Controller 140 can review these experienced-based directives with the subscriber for approval in advance of need and/or at the time or an overage or near-overage.

In one or more embodiments, the Core SDN Controller 140 can access directives from the profile, whether determined by the subscriber or experienced-based directives as described above. In one embodiment, the directives can specify that the subscriber be notified of an overage or a near-overage. In an overage, the account that is associated with the subscriber and the communication device 116 is already beyond a limit as spelled out in the customer agreement. In a near-overage, the account has reached a threshold, or trigger, that is below the level an out-and-out overage but is near enough to cause a concern that the overage limit will be exceeded. For example, the subscriber account may have a data limit of 20 GB, but a trigger or threshold of 90%, such that a warning notification is sent to the subscriber when the account reaches 90% of the data limit, which is 18 GB in this case. In one embodiment, the profile can direct that the system handle the overage and/or near-overage differently for different communication devices 116 associated with a group account. For example, when an account with multiple communication devices 116 reaches a near-overage, the system could be directed to alter data access for some devices while continuing normal data access for other devices. For example, the system 100 can be directed to slow down or shut down data download to a first communication device 116 that is assigned to a child in a family while maintaining data flow to a second communication device 116 that is assigned to a parent. In this way, the system 100 can impose a data reduction onto a child's device to conserve data resources in the group plan while not directly impacting data services to a parent's device.

In one embodiment, the Core SDN Controller 140 can be instructed by the profile to propose a solution to the subscriber via a message to the communication device 116. For example, the message can propose simply raising the data plan limit. In another example, the Core SDN Controller 140 can propose altering the service level that is being provided to the communication device. Dynamic control of data service can be used as a means to extend the resources for which the subscriber has paid. For example, the customer agreement may call for delivery of a certain amount of data that is nominally delivered with a certain quality of service (QoS) level. This QoS level could be in the form data rates that can support high definition (HD) video or can be sufficient to support standard definition (SD) video or can only support low quality definition sufficient for Internet browsing but not video streaming. The Core SDN Controller 140 can offer the subscriber a means for trading off speed/ QoS and data. For example, a user limit of 20 GB might presume HD video capability for the entire 20 GB. However, the same customer agreement might allow for a higher data limit of 30 GB if delivered at SD video capability. Similarly, a lower QoS level might be used to further extend the data limit. In one or more embodiments, the preference profile may specify a mix of QoS levels that is presumed for the agreed upon data limit along with one or more alternative QoS level—data limit mixes that can be used by the system to bias data delivery toward different types of services/ applications within the available data limit.

In one or more embodiments, when the Core SDN Controller 140 determines that the user is at the near-overage, the Core SDN Controller 140 can reformulate the data delivery QoS as directed by the profile. For example, the profile can begin a billing cycle by directing the Core SDN Controller 140 to deliver data using best available paths and data coding to achieve a QoS level for supporting HD video streaming. When the near-overage limit is hit, the profile can direct the Core SDN Controller 140 to deliver data via a slower path and/or data coding to throttle back or slow the data delivery. In one embodiment, altering of the QoS level can differ from communication device 116 to communication device 116 as specified by the profile. In one embodiment, the Core SDN Controller 140 can adjust the QoS level to throttle back or to even suspend data delivery to communication devices 116 as directed by the profile. In one embodiment, modification of the QoS level can slow down the data access by the communication device 116 to preserve the remaining data below the data limit. In one embodiment, the Core SDN Controller 140 can modify the QoS level to reduce the cost of the data that is being delivered (i.e., slower data is less expensive to deliver) while providing a no cost or low cost means for extending the available data limit.

In one or more embodiments, the Core SDN Controller 140 can include resource requirements for providing the service to the communication device 116 in the determination of how to handle the usage of those resources. The Core SDN Controller 140 may determine that the service that has been requested is not particularly data intensive. In such case, the fact that the subscriber is at a near-overage level may not be as critical as it would be if the subscriber was accessing a very intensive service. In one embodiment, the Core SDN Controller 140 can be directed by the preference profile and/or can apply an additional adjust to the handling of over and/or near-overage based on the anticipated requirements/loading for the requested service. In one embodiment, the Core SDN Controller 140 can rank the data requirements for the requested service according to a scale of data intensiveness. The profile can, in turn, include alternative directives for different levels of data intensiveness.

In one or more embodiments, the Core SDN Controller 140 can communicate with the communication device 116, or any other device associated with the subscriber account, regarding the current data/resource usage. In one embodiment, the Core SDN Controller 140 can send a notification to the subscriber with information regarding a near-overage or an actual-overage. The notification can include one or more proposed actions for dealing with the issue. For example, the notification can offer to extend the data limit for the subscriber account via an addition fee. In another example, the notification can offer to extend the data limit while reducing the QoS level for delivery of additional data. In another example, the notification can offer to slow down data delivery such that the subscriber account is less likely to exceed the data limit. In another example, the notification can offer to increase the QoS level or to other increase the network resources that are available to the communication device 116 for delivery of the service and to include an additional fee for this upgrade. In one embodiment, the notification can combine these options to provide the subscriber with a rich set of alternatives for dealing with the data delivery scenario. These options can be applied, across the board, to all of the devices in a group of devices associated with the subscriber or can be applied on a per device basis, with the optional changes (and billings) applied to the devices on a per device basis.

In one or more embodiments, the Core SDN Controller 140 can determine its actual course of action based on a response from the subscriber. In one embodiment, the Core SDN Controller 140 can maintain the current service level and trajectory if no response is received from the subscriber. In one embodiment, the profile can include a default action for the Core SDN Controller 140 in a case, where no response is received from the subscriber. For example, the Core SDN Controller 140 can automatically throttle back or suspend data service to a communication device 116 associated with the subscriber when the subscriber account reaches an overage or a near-overage.

In one or more embodiments, the Core SDN Controller 140 can implement any modification to the network 100, as needed, according to the directive that is determined from the profile and/or by a combined action between the profile and the Core SDN Controller 140. When an overage or a near-overage is detected, the Core SDN Controller 140 may be directed to throttle back data delivery to a communication device 116. For example, during the delivery of streaming video to a communication device 116 may the SDN Network 150 may have routed the data to the communication device 116 via a User Path Gateway 176 in the Core Network 152. This User Path Gateway 176 may, in fact, be implemented as a Virtual Network Function (VNF) that is instantiated by the Core SDN Controller 140. In the process of throttling back data delivery to the communication device 116, the Core SDN Controller 140 may cause a change in performance in of this VNF element, User Path Gateway 176. In one case, the Core SDN Controller 140 can reduce a priority at the VNF element, User Path Gateway 176, such as a priority of communications assigned to the communication device 116 and/or communications assigned to the streaming service. This change in priority can cause the data flow to the communication device 116 to be throttled back. In another case, the VNF element, User Path Gateway 176 can be made up of many individual VNF elements. The Core SDN Controller 140 can decommission one or more VNF elements of the User Path Gateway 176. Again, this approach can throttle back or even shut off the data flow to the communication device 116. In addition, by reducing the priority of VNF elements or decommissioning these VNF elements away from being dedicated to serving the communication device 116, the Core SDN Controller 140 can free up these SDN-based resources for other uses. In one embodiment, the Core SDN Controller 140 can instantiate additional VNF elements to increase speed of service.

In one or more embodiments, the Core SDN Controller 140 can determine a change in billing or charging for service. For example, if the subscriber decides to increase the data limit in response to an overage or a near-overage, then an additional fee may be generated. Similarly, if the directive results in adding new capacity to the data path, then this may generate an additional fee. If the directive results in a reduced service level, such as a reduce QoS level, then this may result in a reduced fee or a comparatively reduced charge for an overage. The Core SDN Controller 140 communicate this charging decision to the SDN Network 150 and to elements within the communication network 100 that are responsible for generating billing.

In one or more embodiments, the SDN Network 150 can adapt the performance of the communication system 100 to maintain customer satisfaction. A Core SDN Controller 140 can, as needed instantiate new resources, decommission existing resources, and/or change priorities of resources. These actions are based, ultimately, upon user decisions regarding handling of overages or potential overages. These system responses can be pre-programmed, generated from historical analysis of prior data limit scenarios, and/or based on direct user input.

In one or more embodiments, the Core SDN Controller 140 receive an indication that the communication network 100 is experiencing some kind of an issue that can result in reduced ability to deliver the service to the communication device 116. In one embodiment, the Core SDN Controller 140 can use the SDN capability to respond to outages/failures/bottlenecks in the network. For example, the Core SDN Controller 140 can receive information from the network (OpenFlow) and determine that there is a problem with congestion and/or an outage that will result in a communication device 116 receiving service that is below a QoS level. In this case, the Core SDN Controller 140 can refer to a Policy Server to determine how to respond. The Core SDN Controller 140 can reallocate resources to or from the communication device 116 depending on circumstances. For example, if a public safety usage is more important that the service requested by the communication device 116, then the public safety use can be given priority over the service requested by the communication device 116.

In one or more embodiments, the Core SDN Controller 140 can receive an indication of a level of degradation of service that is being experienced by the communication device 116. For example, the Core SDN Controller 140 can rank degradations of QoS level according to a scale. The Core SDN Controller 140 can then flexibly adjust pricing for the service that is delivered, under the degraded conditions, based on the ranked level of degradation.

In one or more embodiments, the Core SDN Controller 140 can identify a one or more sources for congestion or outage in the communication system 100. In one embodiment, the Core SDN Controller 140 make a modification or adjustment in the performance of the network. In one embodiment, the Core SDN Controller 140 can rank the congestion or outage and can then determine how to modify the network 100 based on the severity of the ranking. For example, the Core SDN Controller 140 can instantiate additional resources, such as additional VNF elements 171-176, to provide additional resources to ameliorate the congestion or outage. In one embodiment, the Core SDN Controller 140 can determine a billing for the additional resources that are added, if necessary.

Figure 2:
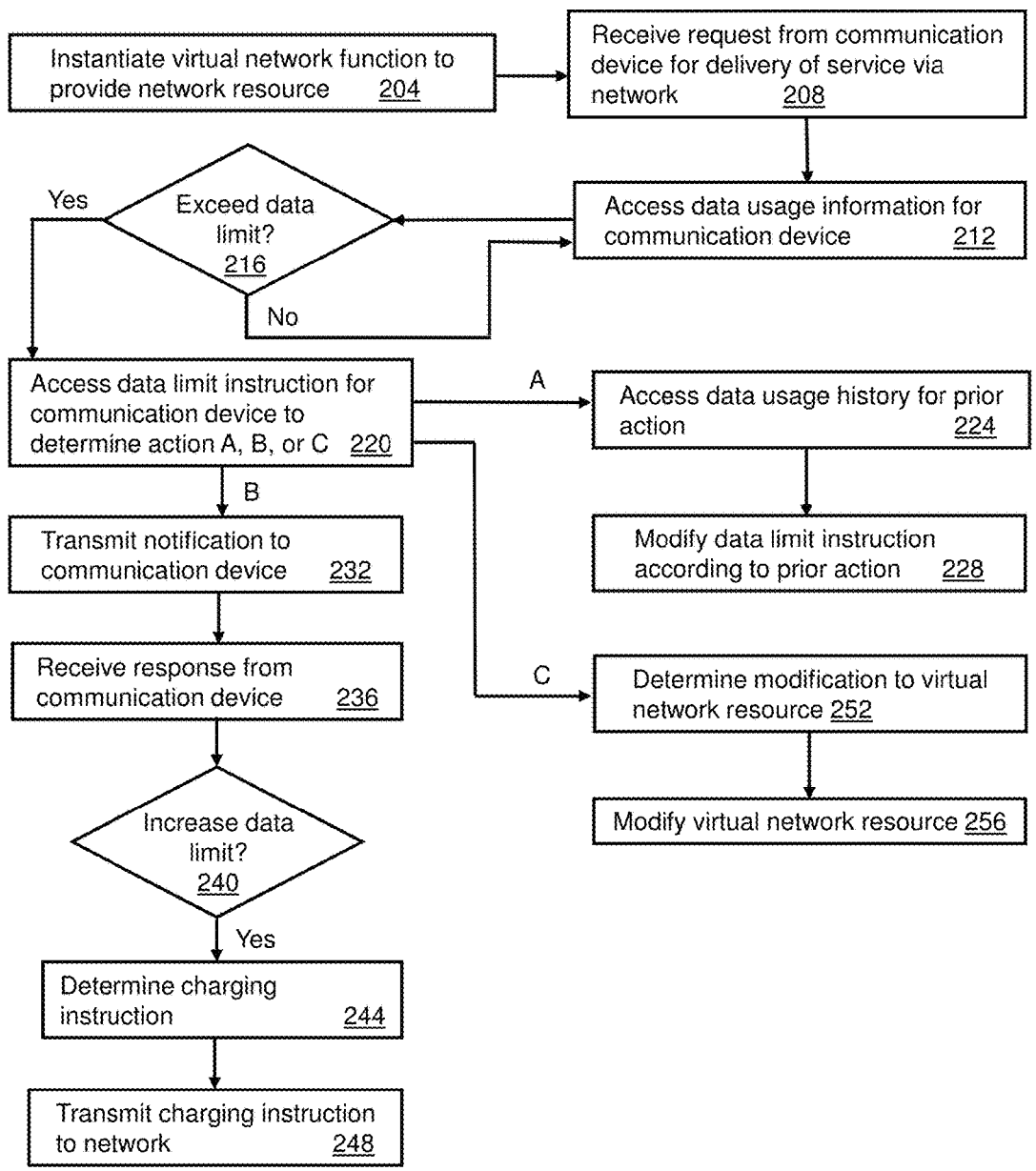
FIGS. 2-5 depicts an illustrative embodiment of a method used in portions of the systems described in FIG. 1 for adapting charging and performance of a computer network.

FIG. 2 depicts an illustrative embodiment of a method used in portions of the systems described in FIG. 1 for adapting charging and performance of SDN network of a communication network. In step 204, a SDN Controller can instantiate a Virtual Network Function (VNF) to provide a network resource. In step 208, the SDN Controller can receive a request for a service from a communication device. The SDN Controller can access data usage information for the subscriber account of the communication device, in step 212, and can determine, whether the subscriber account exceeds a data limit, in step 216.

In step 220, if the SDN Controller can access a data limit instruction for the communication device to determine an action. In one action, the SDN Controller can access data usage history for a prior action, in step 224, and, in turn, to modify the data limit instruction according to the prior action from history, in step 228. In another action, at step 232, the SDN Controller can transmit a notification to the communication device identifying the exceeding of the data limit. In step 236, the SDN Controller can receive a response from the communication device. The SDN Controller can determine if the subscriber agrees to increase the data limit, in step 240, and if so, then can determine a charging instruction, in step 244, and can transmit this charging instruction to the network, in step 248. In another action, the SDN Controller can determine a modification to a virtual network resource, in step 252. In step 256, the SDN Controller can modify the virtual network resource according to the modification that is determined.

Figure 3:
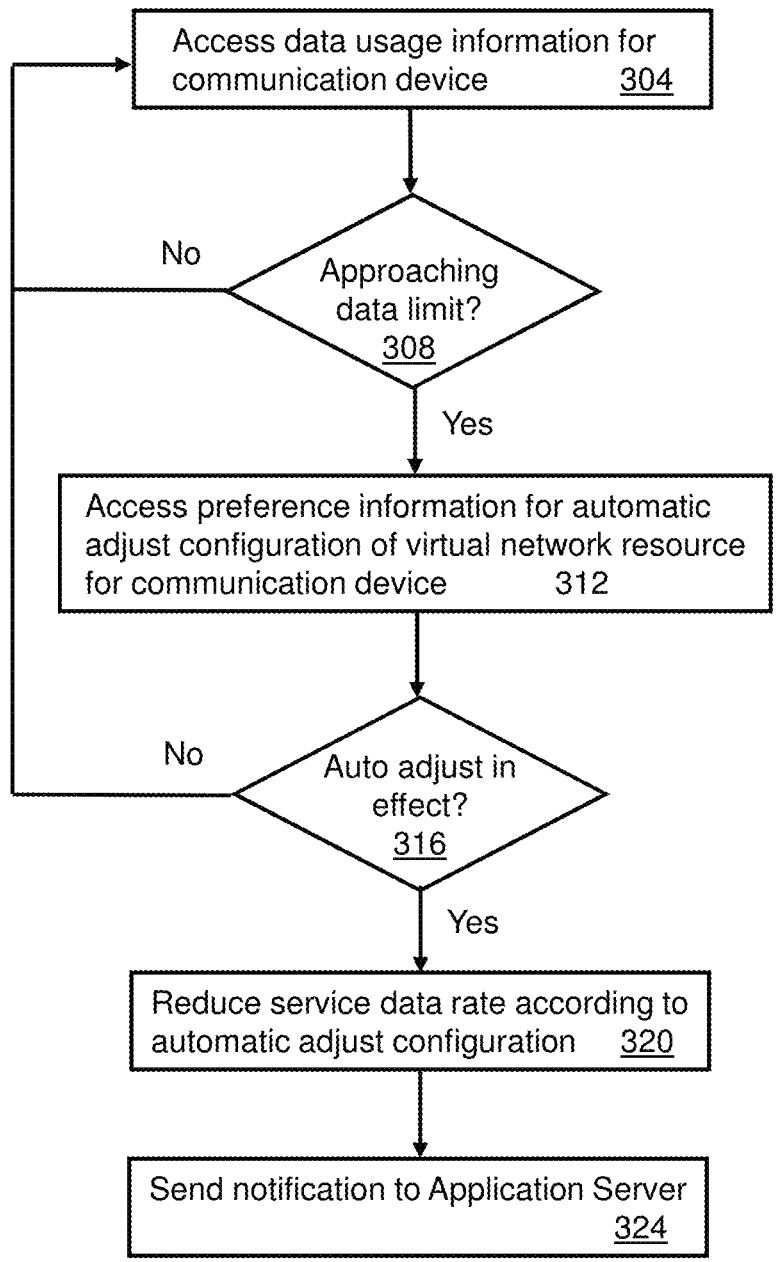

FIG. 3 depicts an illustrative embodiment of a method used in portions of the systems described in FIG. 1 for adapting charging and performance of SDN network of a communication network. In step 304, the SDN Controller can access data usage information for the communication device. The SDN Controller can determine, in step 308, whether the subscription account is approaching a data limit. If so, then the SDN Controller can access preference information for an automatic adjustment configuration of a virtual network resource for the communication device, in step 312. In step 316, the SDN Controller can determine, in step 316, whether the automatic adjustment configuration is in effect. If yes, then, in step 320, the SDN Controller can reduce a service data rate according to the automatic adjustment configuration and, in turn, can send a notification to an Application Server regarding the data limit.

Figure 4:
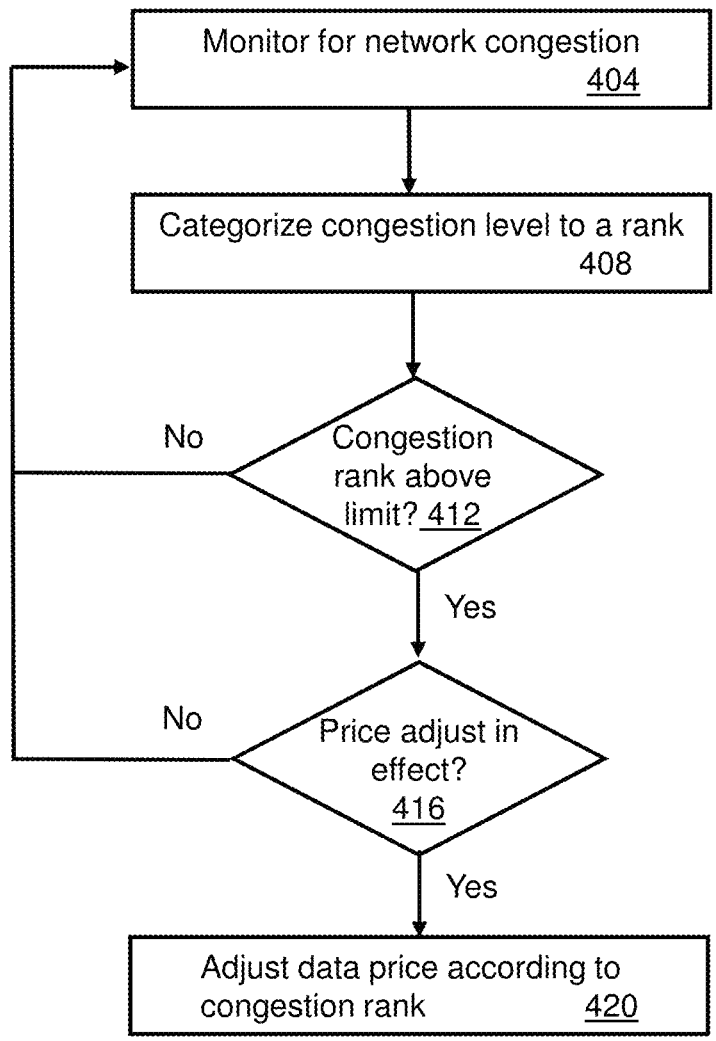

FIG. 4 depicts an illustrative embodiment of a method used in portions of the systems described in FIG. 1 for adapting charging and performance of SDN network of a communication network. In step 404, the SDN Controller can monitor for network congestion and categorize the congestion level to a rank, in step 408. In step 412, the SDN Controller can determine if the congestion rank is above a limit. If it is above the limit, then the SDN Controller can determine if a price or charging adjustment is in effect, in step 416. If a price adjustment is in effect, then, in step 420, the SDN Controller can adjust a data price according to the congestion rank.

Figure 5:
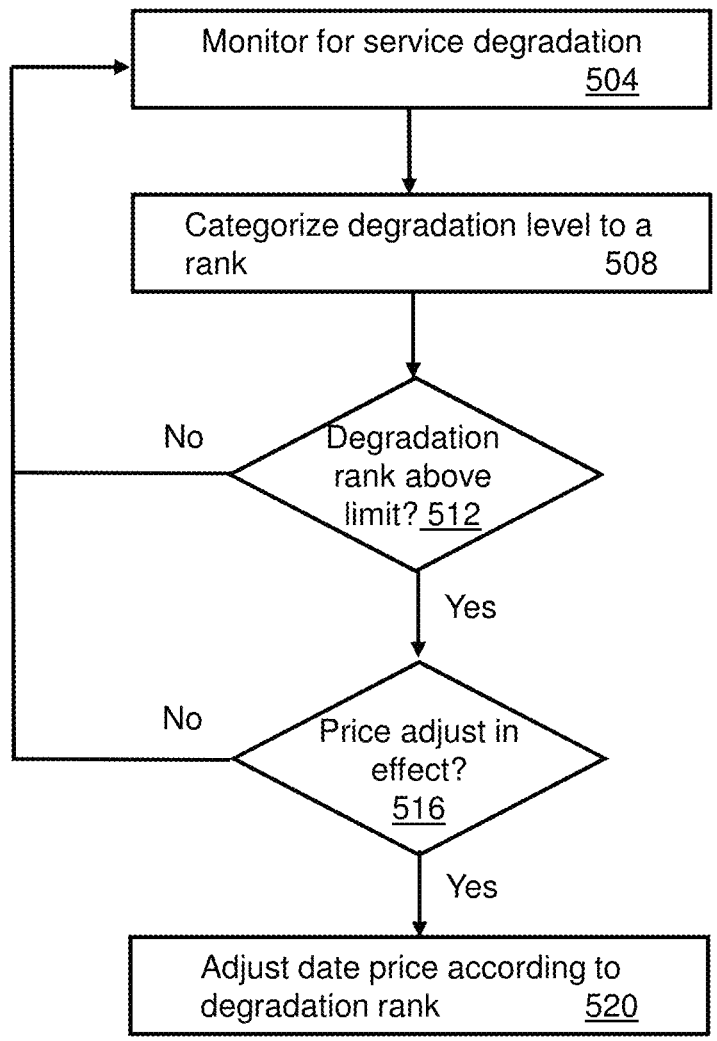

FIG. 5 depicts an illustrative embodiment of a method used in portions of the systems described in FIG. 1 for adapting charging and performance of SDN network of a communication network. In step 504, the SDN Controller can monitor for network degradation and categorize the degradation level to a rank, in step 508. In step 512, the SDN Controller can determine if the degradation rank is above a limit. If it is above the limit, then the SDN Controller can determine if a price or charging adjustment is in effect, in step 516. If a price adjustment is in effect, then, in step 520, the SDN Controller can adjust a data price according to the degradation rank.

While for purposes of simplicity of explanation, the respective processes are shown and described as a series of blocks in FIGS. 2-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
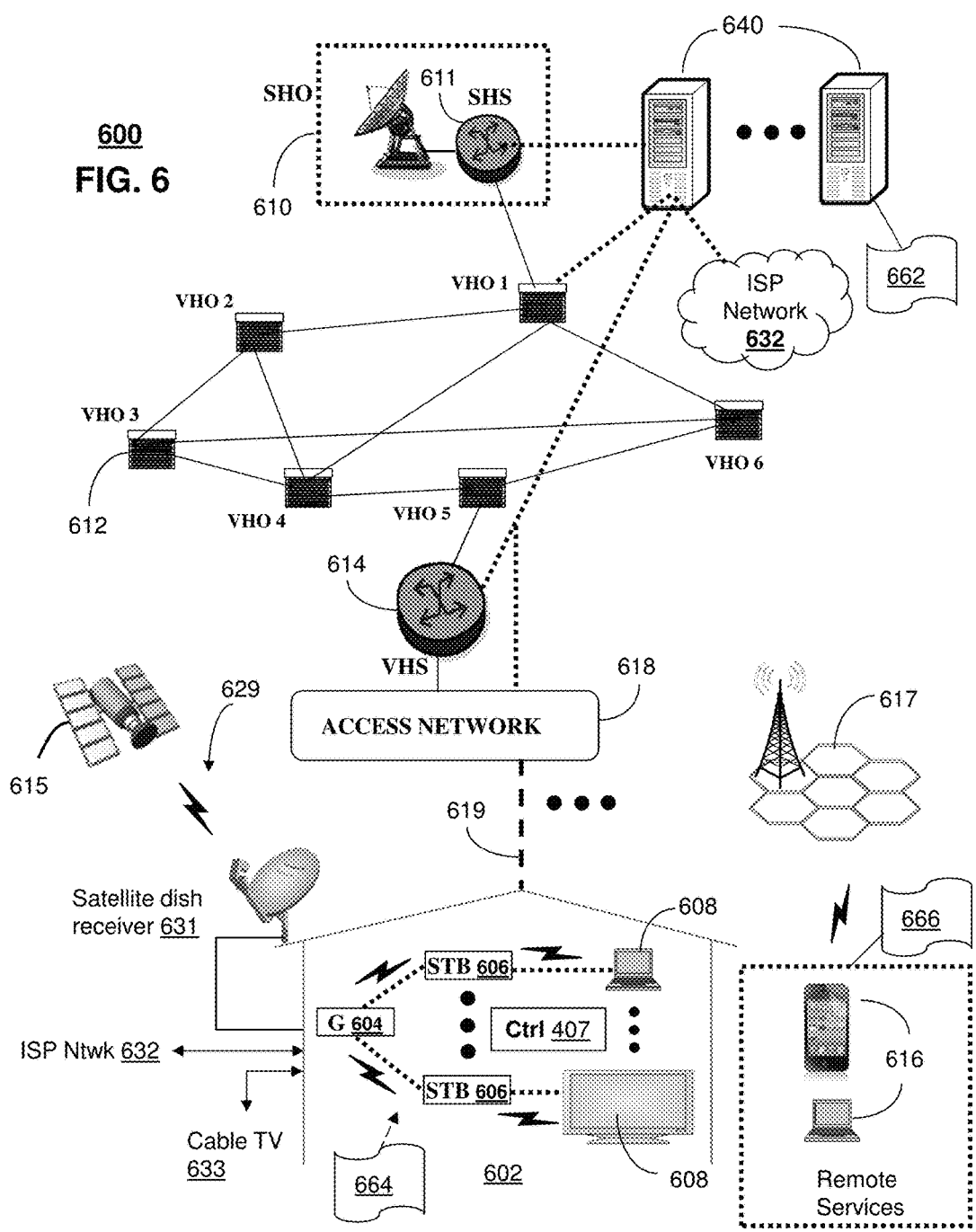
FIGS. 6-7 depict illustrative embodiments of communication systems that provide media services that can be used by the communication network of FIG. 1.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with system 100 of FIG. 1 as another representative embodiment of communication system 100. For instance, one or more devices illustrated in the communication system 600 of FIG. 6 for adapting charging and performance of a Software Defined Network (SDN) of a communication network to provide services to communication devices. A SDN Controller can instantiate a Virtual Network Function (VNF) into the SDN Network for providing a Network Resource. The SDN Controller can access data usage information for a subscriber account associated with a communication device and can determine if the subscriber account is at or near a data network data limit. If the account is at or near limit, then the SDN Controller can determine a course of action from a preference profile. The SDN Controller can notify the communication device and ask if the subscriber wants to increase the limit (for a fee). The SDN Controller can also determine if the preference profile directs a modification in data delivery to the communication device as a result of the overage and, if so, then can modify the performance of the VNF element or some other element in the SDN Network, and can generate a charge for the performance modification and forward this charge to a billing function in the network.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 640, a portion of which can operate as a web server for providing web portal services over the ISP network 632 to wireline media devices 608 or wireless communication devices 616.

Communication system 600 can also provide for all or a portion of the computing devices 640 to function as a SDN Controller. The SDN Controller 640 can use computing and communication technology to perform function 662, which can include among other things, the communication network adaptation techniques described by methods 200-500 of FIGS. 2-5. For instance, function 662 of SDN Controller 640 can be similar to the functions described for SDN Controller of FIG. 1 in accordance with methods 200-500. The media processors 606 and wireless communication devices 616 can be provisioned with software functions 664 and 666, respectively, to utilize the services of SDN Controller 640. For instance, functions 664 and 666 of media processors 606 and wireless communication devices 616 can be similar to the functions described for the communication devices 116 of FIG. 1 in accordance with methods 200-500.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
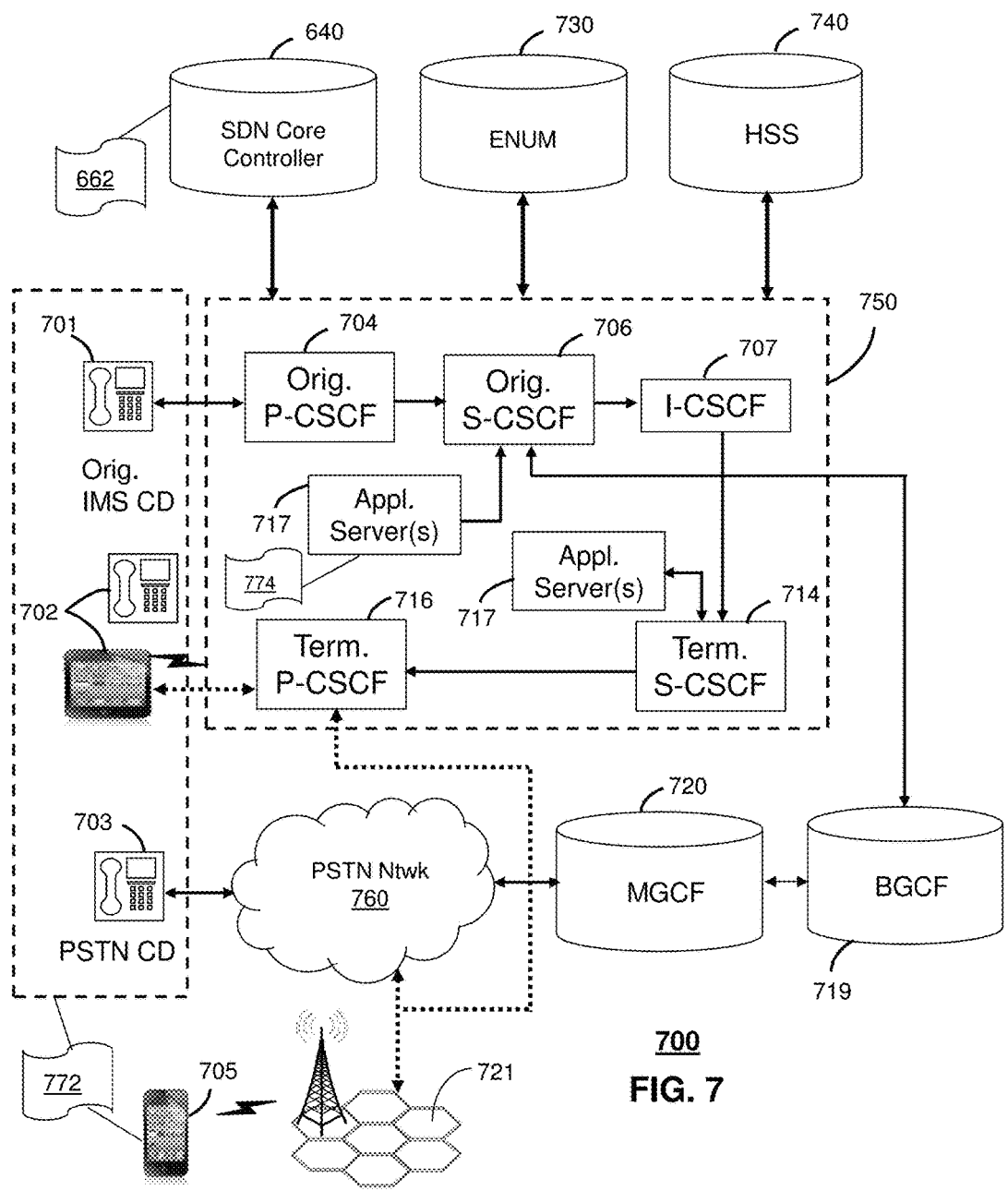

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with system 100 of FIG. 1 and communication system 600 as another representative embodiment of communication system 600. The subject disclosure describes, among other things, illustrative embodiments for adapting charging and performance of a Software Defined Network (SDN) of a communication network to provide services to communication devices. A SDN Controller can instantiate a Virtual Network Function (VNF) into the SDN Network for providing a Network Resource. The SDN Controller can access data usage information for a subscriber account associated with a communication device and can determine if the subscriber account is at or near a data network data limit. If the account is at or near limit, then the SDN Controller can determine a course of action from a preference profile. The SDN Controller can notify the communication device and ask if the subscriber wants to increase the limit (for a fee). The SDN Controller can also determine if the preference profile directs a modification in data delivery to the communication device as a result of the overage and, if so, then can modify the performance of the VNF element or some other element in the SDN Network, and can generate a charge for the performance modification and forward this charge to a billing function in the network.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The SDN Controller 640 of FIG. 6 can be operably coupled to communication system 600 for purposes similar to those described above. SDN Controller 640 can perform function 662 and thereby provide adaptation of the communication system 100 for providing services to the CDs 701, 702, 703 and 705 of FIG. 7 similar to the functions described for SDN Controller 140 of FIG. 1 in accordance with methods 200-500 of FIGS. 2-5. CDs 701, 702, 703 and 705, which can be adapted with software to perform function 772 to utilize the services of the SDN Controller 640 similar to the functions described for communication devices 116 of FIG. 1 in accordance with methods 200-500 of FIGS. 2-5. SDN Controller 640 can be an integral part of the application server(s) 717 performing function 774, which can be substantially similar to function 664 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
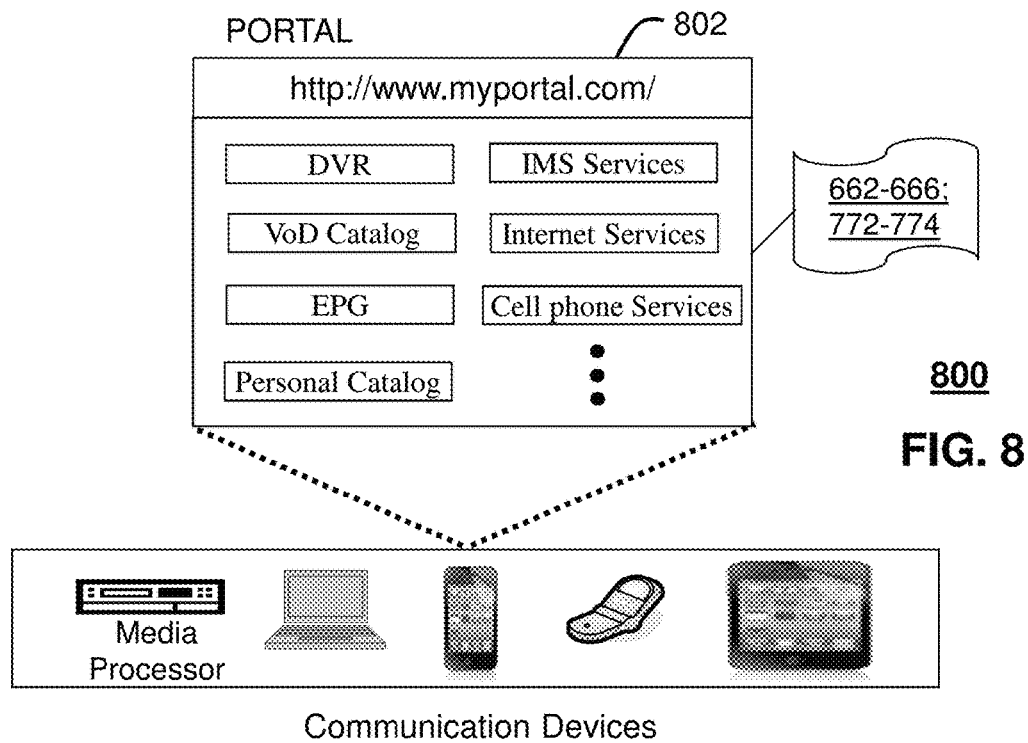
FIG. 8 depicts an illustrative embodiment of a web portal for interacting with the communication systems of FIGS. 1 and 6-7.

FIG. 8 depicts an illustrative embodiment of a web portal 802 of a communication system 800. Communication system 800 can be overlaid or operably coupled with system 100 of FIG. 1, communication system 600, and/or communication system 700 as another representative embodiment of system 100 of FIG. 1, communication system 600, and/or communication system 700. The web portal 802 can be used for managing services of system 100 of FIG. 1 and communication systems 600-700. A web page of the web portal 802 can be accessed by a Uniform Resource Locator (URL) with an Internet browser using an Internet-capable communication device such as those described in FIG. 1 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications 662-666, and 772-774 to adapt these applications as may be desired by subscribers and/or service providers of system 100 of FIG. 1, and communication systems 600-700. For instance, users of the services provided by SDN Controller 140 or 640 can log into their on-line accounts and provision the SDN Controller 140 or 640 with describe a feature that a user may want to program such as user profiles, provide contact information to server to enable it to communication with devices described in FIGS. 1, 6, and 7. Service providers can log onto an administrator account to provision, monitor and/or maintain the system 100 of FIG. 1 or SDN Controller 640.

Figure 9:
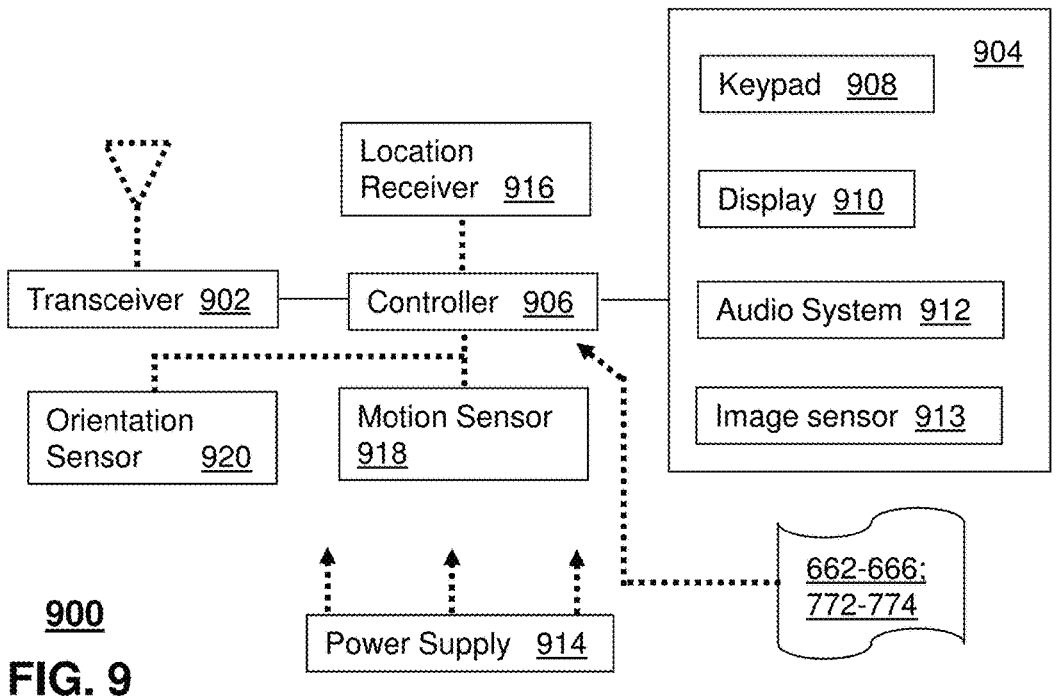
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIG. 1 and FIGS. 6-7 and can be configured to perform portions of methods 200-500 of FIGS. 2-5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIG. 1, the media processor 906, the media devices 908, or the portable communication devices 916 of FIG. 9, as well as the IMS CDs 701-702 and PSTN CDs 703-705 of FIG. 7. It will be appreciated that the communication device 900 can also represent other devices that can operate in systems of FIG. 1, communication systems 900-700 of FIGS. 9-7 such as a gaming console and a media player. In addition, the controller 906 can be adapted in various embodiments to perform the functions 962-966 and 772-774, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
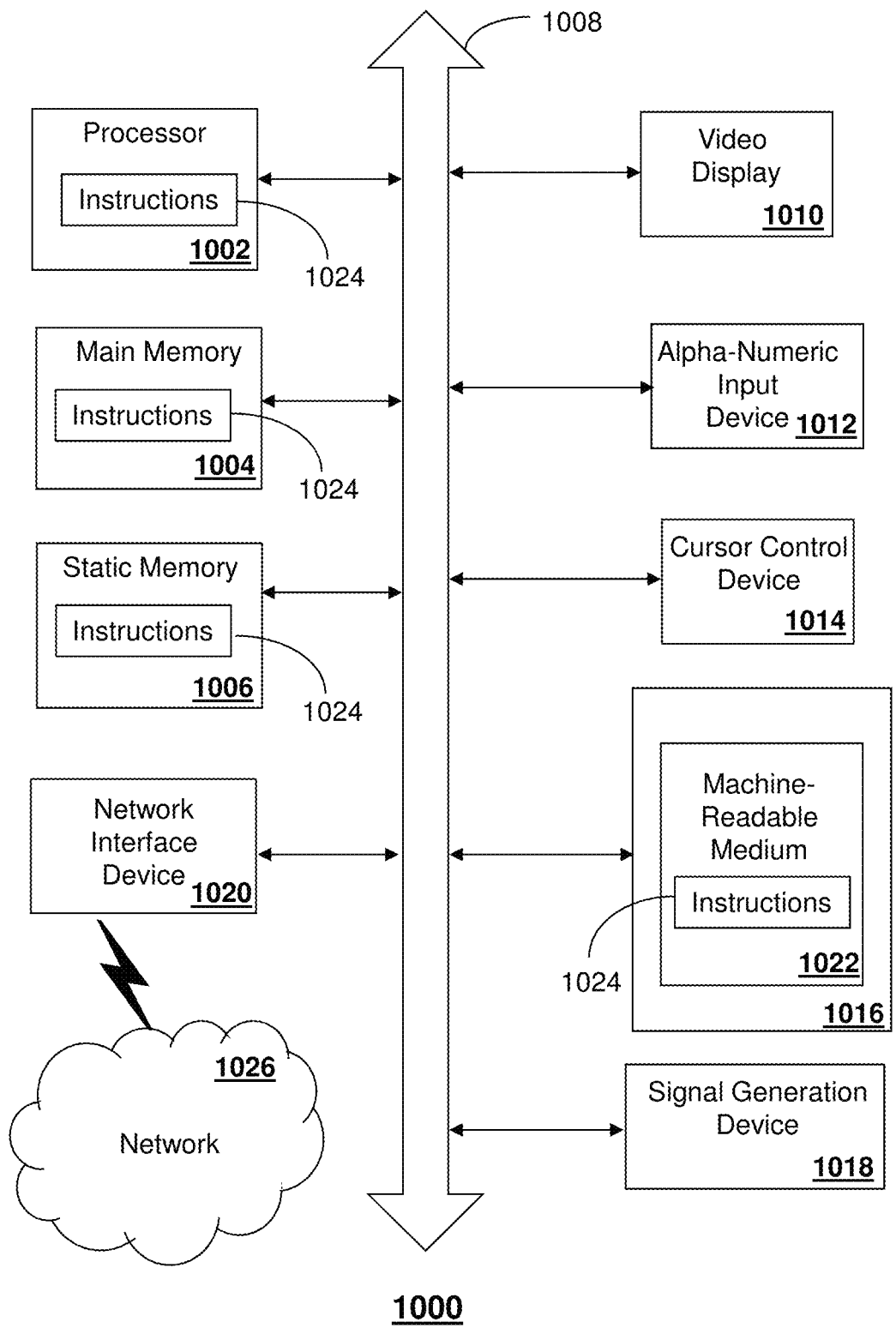
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the SDN Controllers 130-145, and the communication device 116 in FIG. 1. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable medium, comprising executable instructions that, when executed by a processing system including a processor, facilitate performance of operations, comprising:
   instantiating a first virtual network function to provide a network resource in a network;

accessing a first data limit instruction associated with a first communication device responsive to determining that facilitating a service to the first communication device exceeds a data limit threshold;

transmitting a notification to the first communication device that the data limit threshold has been exceeded according to the first data limit instruction;

receiving, from the first communication device, a response to the notification that the data limit threshold has been exceeded; and communicating with the network to cause a modification to the first virtual network function according to the response to the notification, wherein the modification to the first virtual network function comprises a change in a priority of the service at the first virtual network function.

2. The non-transitory machine-readable medium of claim 1, wherein the change in the priority results in a reduced data flow to the first communication device.

3. The non-transitory machine-readable medium of claim 1, wherein the operations further comprise determining whether the first communication device is authorized for the service.

4. The non-transitory machine-readable medium of claim 1, wherein the first data limit instruction is accessed from a policy database.

5. The non-transitory machine-readable medium of claim 4, wherein the modification to the first virtual network function is determined from the policy database.

6. The non-transitory machine-readable medium of claim 1, wherein the first data limit instruction is accessed from a profile associated with the first communication device.

7. The non-transitory machine-readable medium of claim 1, wherein the first communication device is one of a plurality of communication devices, and wherein the first data limit instruction differs from a second data limit instruction associated with a second communication device of the plurality of communication devices.

8. The non-transitory machine-readable medium of claim 1, wherein the notification includes charging information associated with facilitation of the service while the data limit threshold is exceeded.

9. The non-transitory machine-readable medium of claim 1, wherein the operations further comprise receiving, from the first communication device via the network, a request to facilitate the service to the first communication device.

10. The non-transitory machine-readable medium of claim 9, wherein the operations further comprise accessing data usage information associated with the first communication device.

11. A method comprising:
instantiating, by a processing system including a processor, a first virtual network function to provide a network resource in a network;

accessing, by the processing system, a first data limit instruction associated with a first communication device responsive to determining that facilitating a service to the first communication device exceeds a data limit threshold;

transmitting, by the processing system, a notification to the first communication device that the data limit threshold has been exceeded according to the first data limit instruction;

receiving, by the processing system from the first communication device, a response to the notification that the data limit threshold has been exceeded; and transmitting, by the processing system, a directive over the network to cause a modification to the first virtual network function according to the response to the notification, wherein the modification to the first virtual network function comprises a change in a priority of the service at the first virtual network function.

12. The method of claim 11, wherein the change in the priority results in a reduced data flow to the first communication device.

13. The method of claim 11, wherein the first data limit instruction is accessed from a policy database.

14. The method of claim 11, wherein the first communication device is one of a plurality of communication devices, and wherein the first data limit instruction differs from a second data limit instruction associated with a second communication device of the plurality of communication devices.

15. The method of claim 11, wherein the notification includes charging information associated with facilitation of the service while the data limit threshold is exceeded.

16. A device comprising:
a processing system including a processor; and
a memory that stores executable instructions that, when executed by the processing system, facilitate performance of operations comprising:

instantiating a first virtual network function to provide a network resource in a network;

accessing a first data limit instruction associated with a first communication device of a plurality of communication devices, responsive to determining that facilitating a service to the first communication device exceeds a data limit threshold;

transmitting a notification to the first communication device that the data limit threshold has been exceeded according to the first data limit instruction;

receiving, from the first communication device, a response to the notification that the data limit threshold has been exceeded; and transmitting a directive over the network to cause a modification to the first virtual network function according to the response to the notification, wherein the modification to the first virtual network function comprises a change in a priority of the service at the first virtual network function.

17. The device of claim 16, wherein the first data limit instruction is accessed from a profile associated with the first communication device.

18. The device of claim 16, wherein the first data limit instruction is accessed from a policy database, and wherein the modification to the first virtual network function is determined from the policy database.

19. The device of claim 16, wherein the first data limit instruction differs from a second data limit instruction associated with a second communication device of the plurality of communication devices.

20. The device of claim 16, wherein the notification includes charging information associated with facilitation of the service while the data limit threshold is exceeded.

* * * * *